US011020651B2

(12) United States Patent
Smith

(10) Patent No.: US 11,020,651 B2
(45) Date of Patent: Jun. 1, 2021

(54) LEAN-TO-STEER MECHANISMS WITH LINEAR OR NON-LINEAR STEERING RESPONSES

(71) Applicant: Corey C. Smith, Campton, NH (US)

(72) Inventor: Corey C. Smith, Campton, NH (US)

(73) Assignee: Lean Steer Difference, LLC, Campton, NH (US)

(*) Notice: Subject to any disclaimer, the term of this patent is extended or adjusted under 35 U.S.C. 154(b) by 0 days.

(21) Appl. No.: 15/598,659

(22) Filed: May 18, 2017

(65) Prior Publication Data

US 2017/0252637 A1    Sep. 7, 2017

Related U.S. Application Data

(63) Continuation-in-part of application No. PCT/US2016/042877, filed on Jul. 19, 2016.
(Continued)

(51) Int. Cl.
*A63C 17/01* (2006.01)
*A63C 17/00* (2006.01)
(Continued)

(52) U.S. Cl.
CPC ........ *A63C 17/0093* (2013.01); *A63C 17/012* (2013.01); *A63C 17/013* (2013.01);
(Continued)

(58) Field of Classification Search
CPC . A63C 17/0093; A63C 17/012; A63C 17/013; A63C 17/015; A63C 17/016; A63C 17/223; A63C 17/226; B62D 9/02
(Continued)

(56) References Cited

U.S. PATENT DOCUMENTS 904,088 A * 11/1908 Rother .................. A63C 17/24
280/11.32
1,430,319 A * 9/1922 Parker .................. F16C 19/166
384/498
(Continued)

OTHER PUBLICATIONS

ISR/WO for priority application PCT/US2016/042877.
Search report for related EPO application EP 16828394.3.

*Primary Examiner* — Erez Gurari
(74) *Attorney, Agent, or Firm* — Jeffrey E. Semprebon; Semprebon Patent Services

(57) ABSTRACT

The present steerable wheel assembly incorporates a lean-to-steer mechanism into an inner race of a roller bearing, while a wheel is mounted to an outer race of the roller bearing. A shaft extending from the mechanism is attached to a body, and the mechanism acts to steer the outer race and the wheel about a vertical steering axis when the shaft is tilted about a horizontal axis. The mechanism can be a pivot joint, providing a linear steering response, or can be a lean-to-steer mechanism that provides a non-linear response where the steering action is not consistently responsive to tilting over the expected range of tilting. The present non-linear lean-to-steer mechanisms can also be incorporated into alternative lean-to-steer devices, and alternative mechanisms can employ tracking structures to coordinate tilting motion of a first moving element with steering motion of a second moving element to provide a non-linear lean-to-steer response.

11 Claims, 26 Drawing Sheets

Related U.S. Application Data

(60) Provisional application No. 62/194,961, filed on Jul. 21, 2015, provisional application No. 62/310,197, filed on Mar. 18, 2016.

(51) Int. Cl.
    *A63C 17/22* (2006.01)
    *A63C 17/06* (2006.01)
    *A63C 17/02* (2006.01)
    *B62D 9/02* (2006.01)

(52) U.S. Cl.
    CPC .......... *A63C 17/015* (2013.01); *A63C 17/016* (2013.01); *A63C 17/02* (2013.01); *A63C 17/06* (2013.01); *A63C 17/223* (2013.01); *A63C 17/226* (2013.01); *B62D 9/02* (2013.01)

(58) Field of Classification Search
    USPC .................................................. 280/87.042
    See application file for complete search history.

(56) References Cited

U.S. PATENT DOCUMENTS

| | | | |
|---|---|---|---|
| 2,282,589 A | 5/1942 | Mayne | |
| 2,994,545 A | 8/1961 | Gass | |
| 3,224,821 A * | 12/1965 | Barr | F16C 13/02 384/484 |
| 3,442,528 A * | 5/1969 | Rademacher | A63C 17/012 280/87.01 |
| 4,054,297 A | 10/1977 | Solimine | |
| 4,138,127 A | 2/1979 | Kimmell et al. | |
| 4,618,158 A * | 10/1986 | Liberkowski | A63C 17/064 280/11.26 |
| 4,955,626 A * | 9/1990 | Smith | A63C 5/16 280/11.28 |
| 5,169,166 A | 12/1992 | Brooks | |
| 5,232,235 A | 8/1993 | Brooks | |
| 5,330,214 A | 7/1994 | Brooks et al. | |
| 5,372,383 A | 12/1994 | Kubierschky | |
| 5,474,314 A * | 12/1995 | Lehman | A63C 17/0046 280/11.27 |
| 5,513,865 A | 5/1996 | Brooks et al. | |
| 5,964,537 A * | 10/1999 | Hill, Jr. | A63C 17/06 280/11.223 |
| 6,367,819 B1 * | 4/2002 | Andersen | A63C 17/0093 280/11.27 |
| 6,419,248 B1 | 7/2002 | Kay | |
| 6,467,560 B1 | 10/2002 | Anderson | |
| 6,491,308 B1 * | 12/2002 | Bakx | A63C 17/24 280/11.221 |
| 6,543,791 B1 * | 4/2003 | Lee | A63C 17/06 152/47 |
| 6,755,425 B2 | 6/2004 | Gorisch | |
| 6,938,907 B2 | 9/2005 | Hamy | |
| 7,073,799 B2 | 7/2006 | Gorsich | |
| 7,108,331 B2 * | 9/2006 | Hurwitz | A63C 17/0066 152/40 |
| 7,243,925 B2 * | 7/2007 | Lukoszek | A63C 17/0093 280/11.28 |
| 2002/0011713 A1 * | 1/2002 | Kirkland | A63C 17/01 280/11.28 |
| 2003/0122334 A1 * | 7/2003 | Laporte | A63C 17/01 280/87.041 |
| 2003/0141689 A1 | 7/2003 | Hamy | |
| 2003/0146586 A1 * | 8/2003 | Hurwitz | A63C 17/0066 280/11.221 |
| 2004/0041360 A1 | 3/2004 | Lukoszek | |
| 2005/0127629 A1 | 6/2005 | Nelson et al. | |
| 2010/0327546 A1 * | 12/2010 | Nelson | A63C 17/013 280/87.042 |
| 2011/0095598 A1 * | 4/2011 | Hooven | A63C 17/002 301/108.5 |
| 2011/0175310 A1 * | 7/2011 | Lewis | A63C 17/0046 280/87.042 |
| 2011/0272903 A1 * | 11/2011 | Lewis | A63C 17/015 280/87.042 |
| 2011/0272904 A1 * | 11/2011 | Lewis | A63C 17/015 280/87.042 |
| 2015/0224386 A1 * | 8/2015 | Baldauf | A63C 17/012 280/124.103 |
| 2016/0279504 A1 * | 9/2016 | Barnes | A63C 5/035 |
| 2017/0056756 A1 * | 3/2017 | Pikulski | A63C 17/12 |
| 2017/0203193 A1 * | 7/2017 | Powell | A63C 17/012 |

\* cited by examiner

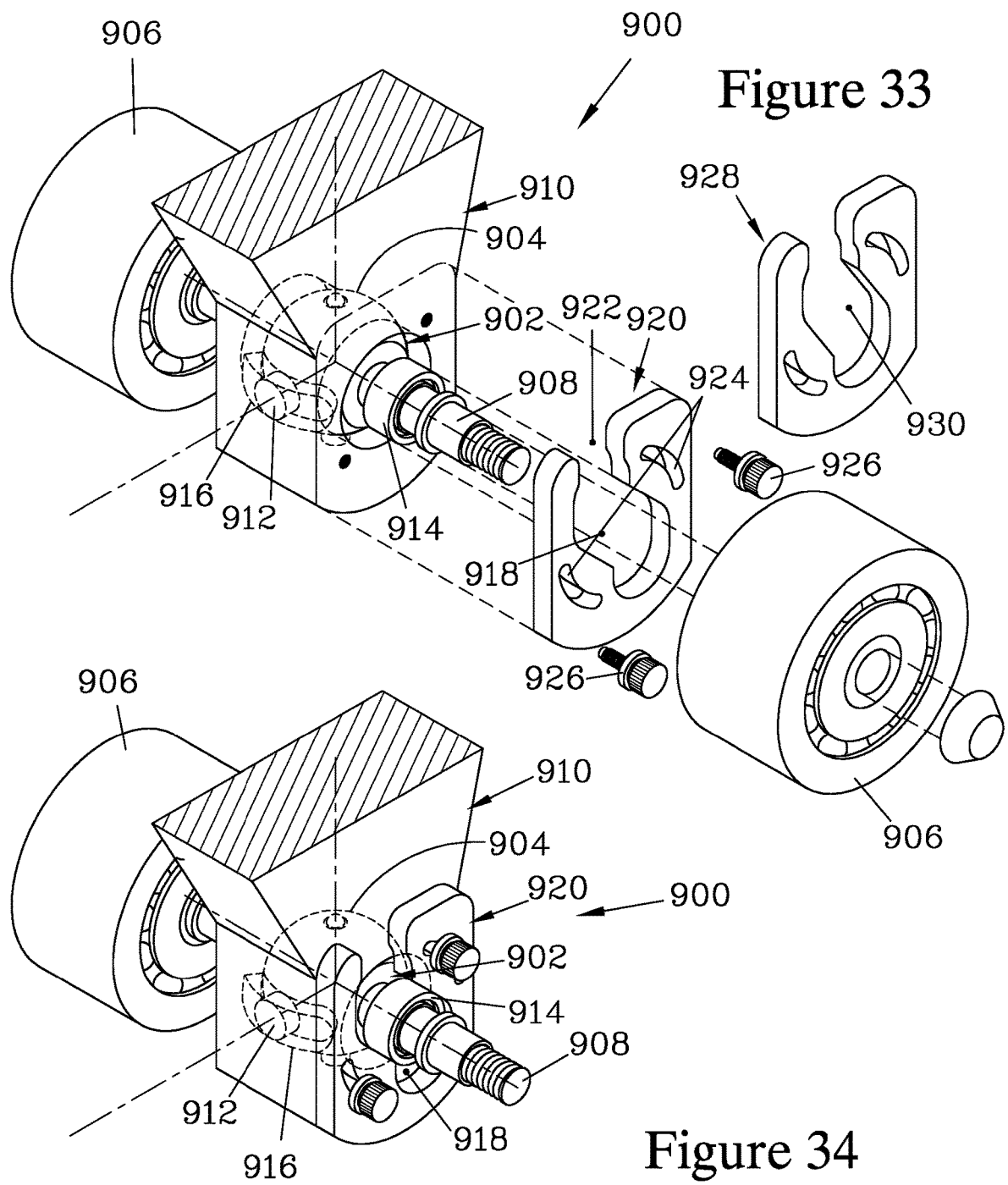

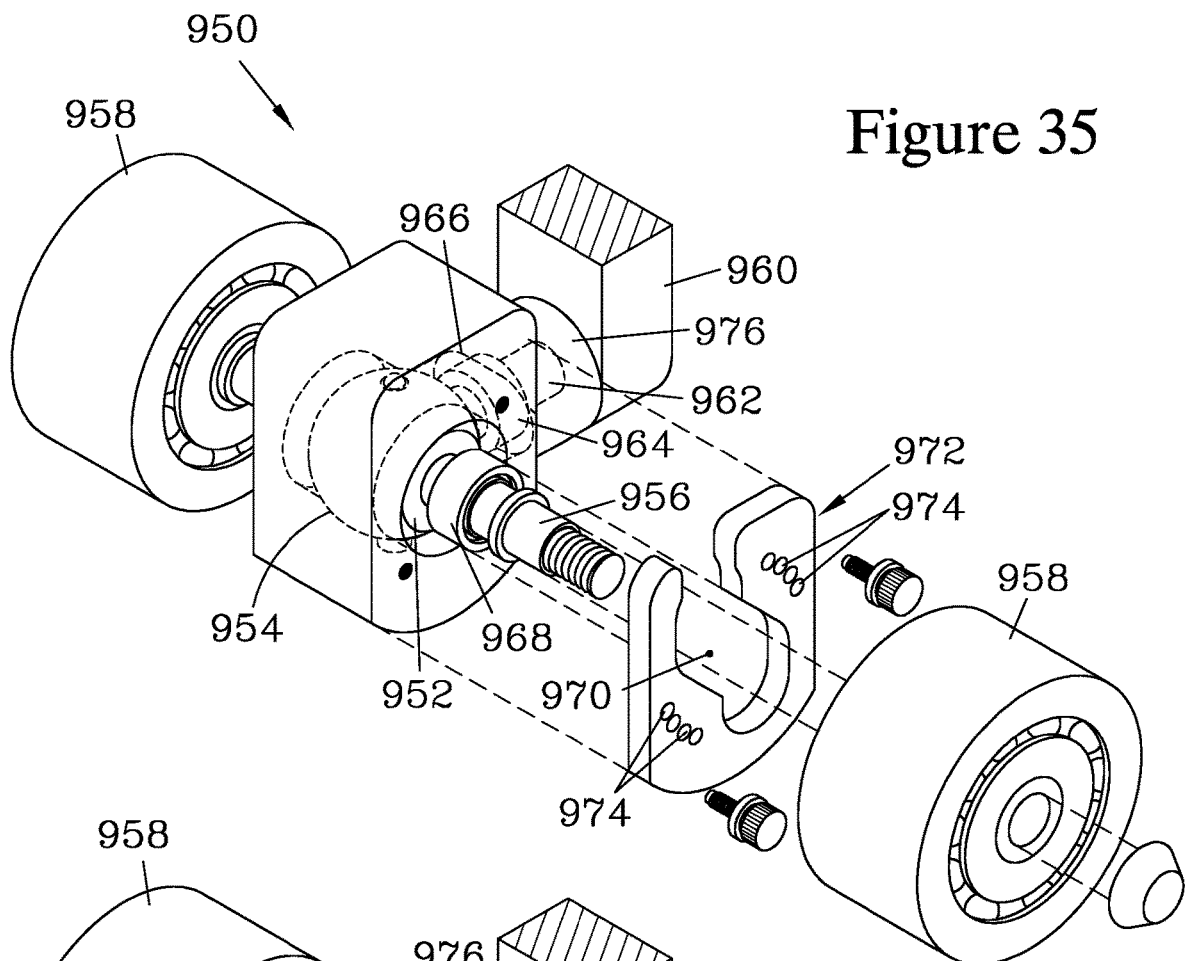
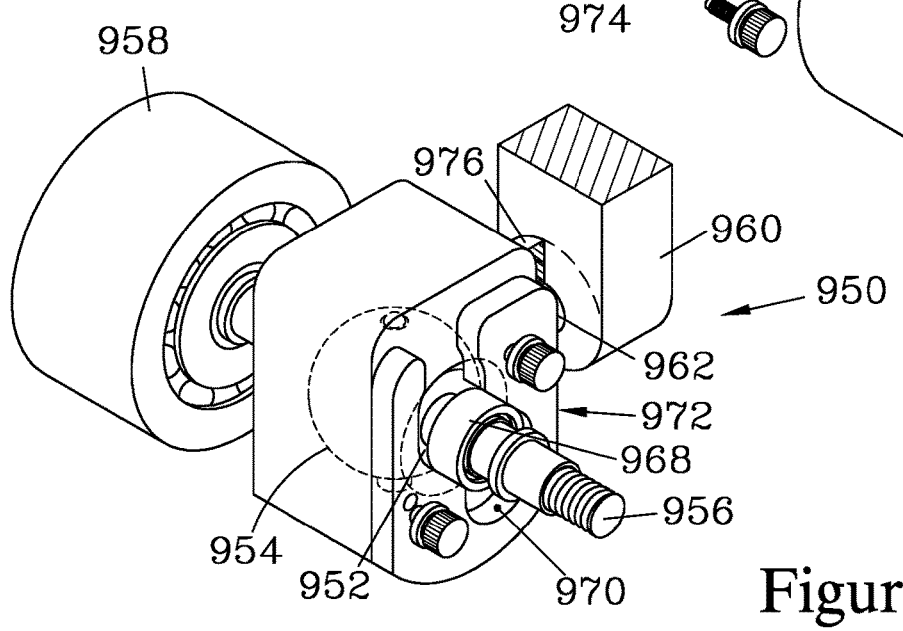
Figure 35
Figure 36

LEAN-TO-STEER MECHANISMS WITH LINEAR OR NON-LINEAR STEERING RESPONSES

FIELD OF THE INVENTION

The present system provides a lean-to-steer wheel assembly and a lean-to-steer mechanism which can be employed in the wheel assembly to provide a desired steering response.

BACKGROUND

Lean-to-steer devices allow an operator to steer a rolling device by shifting their weight from side to side. As the operator stands on a body of the device and shifts their weight, the body leans and a lean-to-steer mechanism pivots one or more wheels of the device to direct it along a curved path. U.S. Pat. No. 5,372,383 teaches various embodiments of a steerable wheel, one of which (FIGS. 15 and 16) employs an inner bearing race mounted on one link member and pivotably connected to a second link member at a central location within the wheel to steer the wheel in response to leaning. U.S. Pat. Nos. 4,138,127 and 7,073,799 teach roller skates having a pair of wheels that pivot on an axis slightly inclined away from horizontal; a similar steering scheme is frequently employed in skateboards. U.S. Pat. Nos. 5,169,166; 5,232,235; 5,330,214; 5,513,865; 6,755425; and 6,938,907 teach devices having a wheel assembly where the bearings of paired wheels tilt relative to horizontal, coordinated by a pair of parallel link members. U.S. Pat. No. 7,243,925 teaches a skateboard truck incorporating a pivot joint where the inclination of the pivot axis can be adjusted to alter the steering response of the skateboard.

SUMMARY OF THE INVENTION

The present invention provides a steerable wheel assembly that steers a wheel in response to tilting of a body supported by the wheel, as well as a lean-to-steer mechanism that can be employed in the steerable wheel assembly to provide a non-linear steering response. The invention has particular utility for "lean-to-steer" devices that steer in response to leaning motions by the operator, such as training skis employed to traverse a ground surface using a skiing motion, roller skates, skateboards, and similar devices. The device is typically equipped with at least two wheel assemblies attached to a body, and leaning the body to one side causes the wheels to steer into a turn in the direction in which the user is leaning. The front wheel assembly steers to turn so as to roll in the desired direction, while the rear wheel assembly steers the opposite direction to facilitate rolling in a tight turn radius. Alternatively, the device may be equipped only with a steerable wheel assembly in the front, and employ a conventional rear wheel assembly. For devices having more than two wheel assemblies, such as in-line roller skates, a series of steerable wheel assemblies can be employed, each adjusted to provide a steering response appropriate to its relative position in the series.

In the wheel assembly of the present invention, the steering action is provided by mounting the wheel to a shaft via a roller bearing, in combination with a motion-limiting mechanism that limits the range of motion between the shaft and an inner race of the roller bearing. The shaft is affixed with respect to the body of the ski or other device, such that leaning of the body causes the shaft to tilt (roll) about a longitudinal axis. Rotation of the wheel relative to the shaft is provided by the roller bearing. The roller bearing also has an outer race, to which the wheel is mounted; the races rotate freely with respect to each other about a roller bearing axis. The wheel has a rim with a substantially flat profile such that, when the assembly traverses a horizontal surface, the flat profile of the wheel rim maintains the roller bearing axis horizontal, parallel to and spaced apart from the surface being traversed. This profile prevents the wheel from leaning in response to leaning of the body, as might occur if a rounded rim were employed. In some cases, the wheel rim may have a slightly curved profile with a shoulder, so as to allow free leaning within a small angle. It may be possible to employ a more rounded rim profile in high-speed applications if the weight distribution of the wheel and speed of rotation allow gyroscopic stabilization to provide sufficient resistance to leaning of the wheel.

The motion-limiting structure, in combination with the effect of the wheel rim in limiting tilting of the roller bearing so as to maintain the roller bearing axis horizontal, controls the range of motion available to the inner race relative to the shaft in response to tilting of the shaft. This range of motion is restricted to generate the desired steering response of the inner bearing to tilting of the shaft, and thus the steering response of the wheel that results from leaning of the body to which the shaft is affixed. The ratio of the steering response to leaning can be either linear or non-linear in character. This approach, where limiting the motion between two elements constrains the available movement so as to require a steering action in order to accommodate tilting of one element relative to the other, can be employed to provide a non-linear steering response to various lean-to-steer devices. The operation of such limited motion in providing a steering response can be most readily understood in the simplest form, where a linear response is provided. This linear response is similar to that provided by prior art lean-to-steer mechanisms that employ pivot joints to control the steering response.

When a pivot joint is employed as the motion-limiting structure, it provides the steerable wheel assembly with a linear response of steering action when the shaft is tilted, where increased tilting of the shaft results in increased steering action of the wheel throughout the anticipated range of tilting during use. In the steerable wheel assembly, the pivot joint connects the shaft to the inner race of the roller bearing, and limits motion therebetween to pivotal motion about a pivot axis, which is inclined with respect to the horizontal plane and is normal to the roller bearing axis. Such a pivot joint can be provided by a spherical plain bearing with a pin inserted therethrough to limit relative motion of the bearing components to motion about the pivot axis. Alternatively, the same motion can be provided by a spherical bearing that is engaged by two pins extending from the inner race, one engaging a socket to define a pivot axis and the other slidably engaging a circumferential groove residing in a plane perpendicular to the pivot axis, or by mounting the shaft to a cross-bar that engages cylindrical recesses in the inner race via cross-bar bearings that serve to reduce friction in the pivotal motion under loads.

Because the pivot axis is inclined, the shaft cannot directly pivot about the longitudinal axis with respect to the roller bearing and the wheel when the user leans the body; instead, pivoting is limited to motion about the pivot axis. Thus, when a torque is applied by the user leaning the body, this torque forces the shaft (which is affixed relative to the body) to pivot with respect to the roller bearing and the wheel about the pivot axis, resulting in two components of rotational motion. One component allows the shaft to tilt away from a horizontal orientation to accommodate the leaning of the body (while the wheel rim remains engaged with the underlying surface, which in turn maintains the roller bearing axis horizontal), while the other component forces the roller bearing and the wheel to pivot about a vertical steering axis so as to cause the wheel to turn in the direction of the lean.

When a ski trainer or similar device is employed having a pair of steerable wheel assemblies, the assemblies are typically mounted such that their pivot axes intersect below the body when the shafts are horizontal. The result of this configuration is that, when the body is leaned to one side, the front wheel steers to turn in the direction of the lean to guide the body into a curve in that direction, while the rear wheel steers the opposite direction so as to allow the body to turn with a tighter curve radius. The device could employ more than two wheel assemblies, such as to provide an in-line roller skate, in which case the pivot axes of the assemblies should be oriented such that they intersect at a common point when the shaft is horizontal.

The responsiveness of the steering action to leaning of the shaft is dependent on the angle of the pivot axis with respect to the horizontal plane. The shaft could be affixed to the body in an adjustable manner so as to allow the inclination of the pivot axis to be adjusted, thereby adjusting the responsiveness of the steering action to suit the desired skiing technique being practiced.

In addition to the adjustment of the steering response in a linear manner as discussed above, it is possible to design the motion-limiting structure that connects the shaft to the inner race in such a manner as to provide a non-linear response to leaning. For example, in one application of a non-linear response, the range of steering action is limited such that only a certain range of tilting of the shaft can be accommodated by steering action of the inner race, and further tilting beyond the specified range results in tilting of the wheel rim relative to the underlying surface, allowing the wheel to more easily skid sideways rather than roll.

In another example of a non-linear response, the motion can be limited to simulate the response of an alpine ski, where curving action increases with increasing tilt up to a certain degree of tilt, and thereafter remains relatively constant. To achieve this effect, the motion-limiting structure restricts the motion of the inner race relative to the shaft such that tilting within a certain range results in increasing steering action of the inner race (as discussed above for the embodiments employing a pivot joint), but allowing greater tilting of the shaft outside that range without causing further steering action of the inner race. Such actions can be provided by an inner spherical element affixed to the shaft engaged with an outer spherical socket in the inner race, in combination with guide elements and associated motion-limiting elements that restrict the motion between the spherical elements, where at least one of the motion-limiting elements guides its associated guide element along a non-linear path. To provide an alpine ski-type steering response, the non-linear path can have a linear response segment, in which the guide element is directed so as to provide the effect of a pivot joint between the inner spherical element and the outer spherical socket, and end segments bracketing the linear response segment and directing the guide element so as to allow tilting of the shaft without causing a steering response.

In a typical example, the inner spherical element is provided with two guide elements, each slidably and rotatably engaging a motion-limiting element in the outer spherical socket, one of which limits the motion of its associated guide element to allow rotation of the elements about the steering axis, and the other of which guides its associated guide element along a non-linear path to provide the desired steering response to tilting. Adjustment of the steering response can be provided by allowing the inclination and/or position of one or more of the motion-limiting elements to be adjustable, and/or by providing one or more of the motion-limiting elements on a component of the outer spherical socket that can be to be replaced with a similar component having a different motion-limiting element configuration.

For either linear or non-linear lean-to-steer mechanisms, further adjustment of the steering response can be provided by the use of resilient elements between components to bias their motion with respect to each other. Adjustment of the steering response can also be provided by mounting the lean-to-steer mechanism(s) to a body so as to provide a limited degree of flexibility (or providing a degree of flexibility in the body itself), where the flexibility allows the user to further adjust the response by shifting their weight forward or rearward to slightly adjust the inclination of the lean-to-steer mechanism.

The steerable wheel assembly of the present invention provides great flexibility in adjusting the steering performance of the wheels in response to leaning, and does so while placing minimal restrictions on the structure for mounting the wheel assemblies to the body of the device, making the wheel assemblies well-suited for adaptation to a variety of lean-to-steer devices.

Additionally, the lean-to-steer mechanism providing a non-linear response could be incorporated into other lean-to-steer devices. For example, the outer spherical socket could be incorporated into a fork to which a wheel is rotatably mounted, allowing a greater range of tilting without interference between the components. Similarly, the lean-to-steer mechanism could be incorporated into a skateboard truck, with a pair of wheels mounted to the shaft of the mechanism, with the shaft extending from an inner spherical element that pivots within an outer spherical socket that is mounted to the body of the device.

Alternative structures can be employed to provide similar non-linear steering responses. Lean-to-steer mechanisms of the present invention have a first moving element, which is affixed with respect to a body of a lean-to-steer device, and a second moving element, to which one or more wheels are rotatably mounted. The moving elements are movably connected together such that the second moving element can pivot with respect to the first moving element about a central point that resides at the intersection of a horizontal longitudinal axis and a vertical steering axis. The movable connection is configured to allow the first moving element to pivot about the longitudinal axis, to allow tilting of the body, and to allow the second moving element to pivot about the steering axis, to allow the steering response. Means for limiting the motion of the first moving element with respect to the second moving element are provided, and are configured to coordinate the combined tilting and steering pivoting such that tilting of the first moving element about the longitudinal axis can only be accommodated by causing the second moving element to pivot about the steering axis to maintain the axis of rotation of the wheel(s) horizontal.

The means for limiting the motion to provide the non-linear steering response typically employ a first element tracking structure mounted with respect to the first moving element and a corresponding second element tracking structure mounted with respect to the second moving element. The first element tracking structure can have one or more guide elements which engage corresponding track elements that provide the second element tracking structure, the track elements each being configured to direct the corresponding guide element along a non-linear path.

BRIEF DESCRIPTION OF THE FIGURES

FIGS. 23-46 illustrate additional lean-to-steer devices that employ such non-linear mechanisms.

FIGS. 1-3 illustrate a steerable wheel assembly that has a shaft that is connected to a roller bearing via a pivot joint; in this embodiment, the pivot joint is provided by a pinned spherical plain bearing that is installed into an inner race of the roller bearing. A wheel is attached to an outer race of the roller bearing, while the shaft extends through the spherical central element of the pivot joint. The pin through the spherical plain bearing limits motion between the shaft and the inner race to pivoting motion about a pivot axis, which is defined by the pin. When the shaft is leaned about a longitudinal axis of travel as indicated by the arrow L, the motion of the shaft is constrained by the pivot joint, which prevents the shaft from simply pivoting about the longitudinal axis. Because the motion of the shaft is constrained, the torque applied causes the shaft to pivot about the pivot axis, as indicated by the arrow P. In addition to accommodating the leaning motion L of the shaft, the pivoting motion P also causes rotation of the roller bearing and wheel relative to the shaft about a vertical steering axis, as indicated by the arrow S. Since the shaft is fixed relative to the body to which the steerable wheel assembly is mounted, the roller bearing and wheel are turned relative to the body about the steering axis. This motion also causes rotation of the pivot axis about the front steering axis, as indicated by the arrow $S_A$.

FIGS. 2 and 3 illustrate the shaft, pivot joint, and inner race of the roller bearing, with the outer race and wheel removed for clarity. The elements are shown with the pivot axis angled in the opposite direction compared to FIG. 1, to better illustrate the pin that passes through the spherical plain bearing to limit motion to pivoting motion about the pivot axis, defined by the pin. FIG. 3 illustrates these components partially exploded.

FIGS. 4 and 5 illustrate the operation of the pivot joint by representing the pivoting action as a slot which the shaft passes through. The slot limits the relative motion of the shaft to motion about the pivot axis, represented by the slot which resides in a plane normal to the pivot axis. As shown in FIG. 4, the shaft is horizontal. When the shaft is tilted away from the horizontal, as shown in FIG. 5, the constraint of the slot on the motion requires the cylinder (representing the pivot joint) to rotate in order to accommodate tilting of the shaft. Because the engagement of the wheel with the underlying surface constrains motion of pivot joint, the cylinder is forced to rotate about the vertical steering axis, and thus causes the roller bearing and wheel to turn in response to tilting of the shaft.

FIG. 6 illustrates a ski trainer employing two of the steerable wheel assemblies shown in FIG. 1. The rear assembly has a pivot axis oriented as shown in FIG. 1, while the front assembly has its pivot axis oriented as shown in FIGS. 2 & 3. The shafts of the wheel assemblies are affixed to rigid forks attached to a body.

FIG. 7 illustrates the shaft, pivot joint, and roller bearing shown in FIG. 1 with the addition of two resilient bushings that are installed on the shaft, abutting against the inner race of the roller bearing. The resilient bushings provide a biasing force that tends to keep the shaft aligned with the rotation axis of the roller bearing, to provide a centering action to the leaning and steering actions of the steerable wheel assembly.

FIGS. 8 and 9 illustrate two examples of ski trainers similar to that shown in FIG. 6, where the angles of the pivot joints are selected to provide a desired steering response. In both cases illustrated, the front wheel assembly is mounted with a steeper pivot angle than the rear wheel assembly, with the result that the front wheel turns more than the rear wheel when the ski is leaned by the user.

FIG. 10 illustrates the angles of pivot axes for a series of steerable wheel assemblies employed in an in-line roller skate. The pivot axes are set such that, when the shafts of the wheel assemblies are horizontal, the pivot axes intersect at a common point.

FIG. 11 illustrates canting of a pair of ski trainers due to the stance of the user, which results in the wheel assemblies having their shafts slanted away from horizontal. This cant causes the wheels to steer away from rolling in a straight direction, and is thus undesirable. FIG. 12 illustrates a pair of ski trainers that employ shims to overcome the problem with canting, while FIG. 13 illustrates a pair of ski trainers where the shafts are adjustably mounted in the brackets to provide an adjustable degree of cant that can be matched to the stance of the user.

FIGS. 14 and 15 illustrate a steerable wheel assembly and mounting bracket that facilitate adjustment of the pivot angle of the assembly, as well as allowing adjustment to provide canting of the bracket to a desired degree.

FIGS. 16 and 17 illustrate a steerable wheel assembly that employs an alternative structure for providing a pivot joint between the shaft and the inner race of the roller bearing, which is expected to provide greater freedom of motion under heavy loads. In this embodiment, the shaft is affixed to a trunnion member having trunnion bearings at each end, mounted so as to define a pivot axis that is perpendicular to the shaft. The inner race is provided with a pair of bearing seats that receive the trunnion bearings and position them such that the pivot axis that they define is perpendicular to the roller bearing axis about which the outer race rotates with respect to the inner race. FIG. 16 is shown assembled, while FIG. 17 is exploded and partially sectioned to more clearly show the trunnion bearings and the bearing seats.

FIGS. 18 and 19 illustrate an alternative motion-limiting structure, where the shaft is again provided with an inner spherical element that resides in a spherical socket provided on the inner race, but rather than being connected by a pivot pin, the relative motion between the spherical element and the spherical socket is controlled by two pins extending inwards from the spherical socket; a first pin engages a circular recess on the spherical element, limiting motion to rotation about the axis of the first pin, while a second pin engages a circumferential groove, and rotation of the spherical element about the first pin axis causes the second pin to track along the groove.

FIG. 20 illustrates a spherical element similar to that shown in FIGS. 18 and 19, but which has a truncated groove that limits how far the spherical element can rotate about the first pin axis. This limit results in a non-linear steering response, where the inner race rotates about a vertical steering axis to accommodate leaning of the shaft only to the point where the second pin engages an end of the truncated groove; thereafter, further tilting of the shaft can only be accommodated by tilting of the inner race and the wheel mounted thereto.

FIG. 21 is a visual representation, similar to that shown in FIGS. 4 and 5, illustrating another possible non-linear steering response. In this response, the steering action is linear up to a certain point, after which further tilting of the shaft can be accommodated without forcing further steering action of the inner race of the roller bearing. This effectively sets a maximum degree of steering, to simulate the response of a ski designed to curve at a set radius.

FIG. 22 illustrates one embodiment of a motion-limiting structure that can provide a non-linear steering response such as visually represented in FIG. 21. In this embodiment, the inner race is provided with a spherical socket and an extending pin, while the shaft is provided with an inner spherical element with a groove. Motion between the spherical element and the spherical socket can be motion pivoting about the pin, motion that slides the pin along the groove, or a combination of the two. The only motion which is blocked is rotation of the spherical element about a roller bearing axis of the inner race. A guide plate is affixed to the inner race, and is similarly blocked from rotation about the roller bearing axis relative to the spherical element and the shaft; since the shaft is fixed to the body of the device, this blocked rotation maintains the guide plate at a consistent orientation with regard to the underlying ground surface, to which the roller bearing axis remains parallel. The guide plate has a guide slot that limits the motion of the shaft; a central segment is inclined, limiting motion between the shaft and the inner race to essentially pivoting motion about a pivot axis, and resulting in a linear steering response to tilting while the shaft engages the central segment. The guide slot also has two vertical end segments, which allow the shaft to tilt freely without causing any further steering action of the inner race.

FIG. 23 shows an alternative lean-to-steer mechanism for providing a linear response, employing an inner spherical element and an outer spherical socket, with rotation therebetween controlled by a pair of bearings that engage bearing seats to provide motion similar to that of the embodiment shown in FIGS. 16 and 17.

FIG. 24 illustrates a lean-to-steer mechanism that has features in common with the mechanism shown in FIG. 23, having two bearings extending from an inner spherical element, but having an outer spherical socket with two guide tracks that are engaged by the bearings to control the motion of the outer spherical socket in response to tilting of the inner spherical element. One of the guide tracks directs its engaged bearing along a non-linear path having a segment which provides a linear response, and end segments that allow the inner spherical element to tilt without any further steering action.

FIG. 25 illustrates a lean-to-steer assembly that incorporates elements of the lean-to-steer mechanism shown in FIG. 24, but where a wheel is mounted to a fork member and is offset from the inner spherical element and outer spherical socket, allowing a greater range of tilting without interference between components.

FIGS. 26 and 27 illustrate another lean-to-steer mechanism that provides a non-linear steering response, and which is configured such that a shaft of the mechanism extends along a longitudinal axis, allowing use in devices where a transverse shaft for mounting the mechanism would be inappropriate. The lean-to-steer mechanism again has an inner spherical element with a pair of guide bearings mounted thereon, and an outer spherical socket with two guide tracks that engage the bearings to limit their motion.

FIG. 28 illustrates one end of a device that incorporates the lean-to-steer mechanism shown in FIGS. 26 and 27.

FIGS. 29-31 illustrate lean-to-steer mechanisms similar to the mechanism shown in FIGS. 26 & 27, but where the response can be adjusted by substituting alternative guide slots and/or by adjusting the inclination of at least one of the guide slots.

FIG. 32 illustrates an lean-to-steer mechanism similar to that shown in FIGS. 26 and 27, but which has a resilient member that provides a centering force when the inner spherical element is tilted.

FIGS. 33-36 illustrate lean-to-steer mechanisms that are particularly well suited for use as skateboard trucks, having a wheel shaft extending from an inner spherical element with a wheel mounted on each end of the wheel shaft. A guide bearing mounted on the wheel shaft engages a guide slot in a plate that directs it along a non-linear path.

FIGS. 37 & 38 illustrate a steerable wheel assembly that incorporates resilient tension members that engage an inner race and tensioning members that can be adjustably positioned along a shaft to vary the tension; when the shaft it tilted, the tension members are stretched, generating a reaction force biasing the shaft back to a neutral horizontal position.

FIGS. 39-41 illustrate a lean-to-steer mechanism that forms another embodiment of the present invention, and which employs an alternative structure to provide a non-linear lean-to-steer response. FIG. 39 is an assembled view of the mechanism, which employs tracking structures to coordinate the tilting action of a first moving element to the steering action of a second moving element, where the tracking structures are separate from the connecting elements that allow for relative tilting and steering movement of the two moving elements with respect to each other. The first moving element, which is designed to be affixed to a body, rotatably engages a shaft that in turn is mounted to the second moving element; this rotatable engagement allows the first moving element to tilt about a longitudinal axis. The shaft in turn is mounted to the second moving element by a trunnion member that allows pivoting about a steering axis. The first moving element has a first element tracking structure provided by guide rollers mounted so as to rotate about axes that intersect a central point that resides on both the longitudinal axis and the steering axis, while the second moving element has a second element tracking structure formed by guide ramps that direct the guide rollers along non-linear paths that force the second moving element to pivot about the steering axis in response to tilting of the first moving element.

FIG. 40 is an exploded view of the mechanism shown in FIG. 39, better illustrating the individual components of the mechanism.

FIG. 41 is a partial view illustrating how the tracking structures of the mechanism shown in FIGS. 39 and 40 coordinates the motion of the moving elements.

FIG. 42 illustrates an alternative second moving element for use in a mechanism such as shown in FIGS. 39-41, having guide ramps that are provided on a replaceable clip to allow replacement with an alternative clip having guide ramps with a different configuration to change the steering response.

FIGS. 43-44 illustrate a lean-to-steer mechanism that forms another embodiment of the present invention, which provides a response similar to that of the mechanism shown in FIGS. 39-41, but which employs a spherical bearing structure rather than a trunnion member to connect a shaft to a second moving element in order to connect a first moving element to the second moving element while allowing pivoting motion about longitudinal and steering axes. FIG.

43 is an assembled view, while FIG. 44 is an exploded view illustrating the components of the mechanism.

FIGS. 45 and 46 illustrate a lean-to-steer mechanism that forms another embodiment of the present invention, which is functionally similar to the embodiment shown in FIGS. 26-28, but which is designed to provide more balanced forces for greater strength. FIG. 45 is an assembled view, while FIG. 46 is partially exploded to better show the components. In addition to extending the shaft and employing a pair of offset guide rollers to provide more balanced forces, further strength is provided by employing a tie rod as a brace that connects the moving elements while still allowing relative tilting and steering motion.

DETAILED DESCRIPTION

Figure 19:
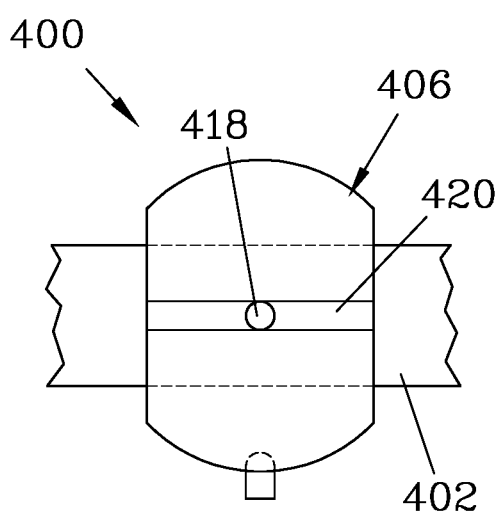
Figure 20:
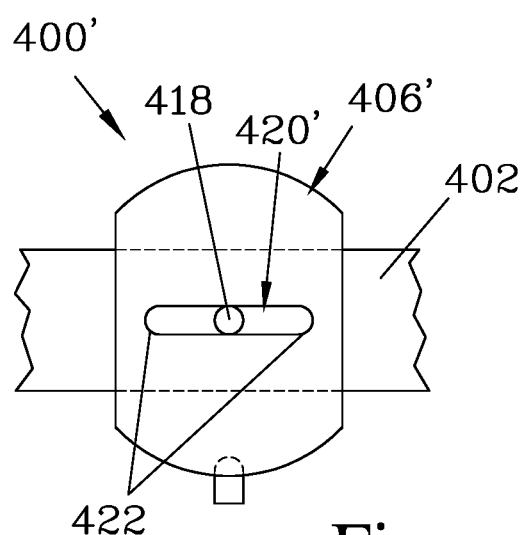
FIGS. 20-22, 37 & 38 illustrate steerable wheel assemblies incorporating a lean-to-steer mechanism providing a non-linear response.
Figure 21:
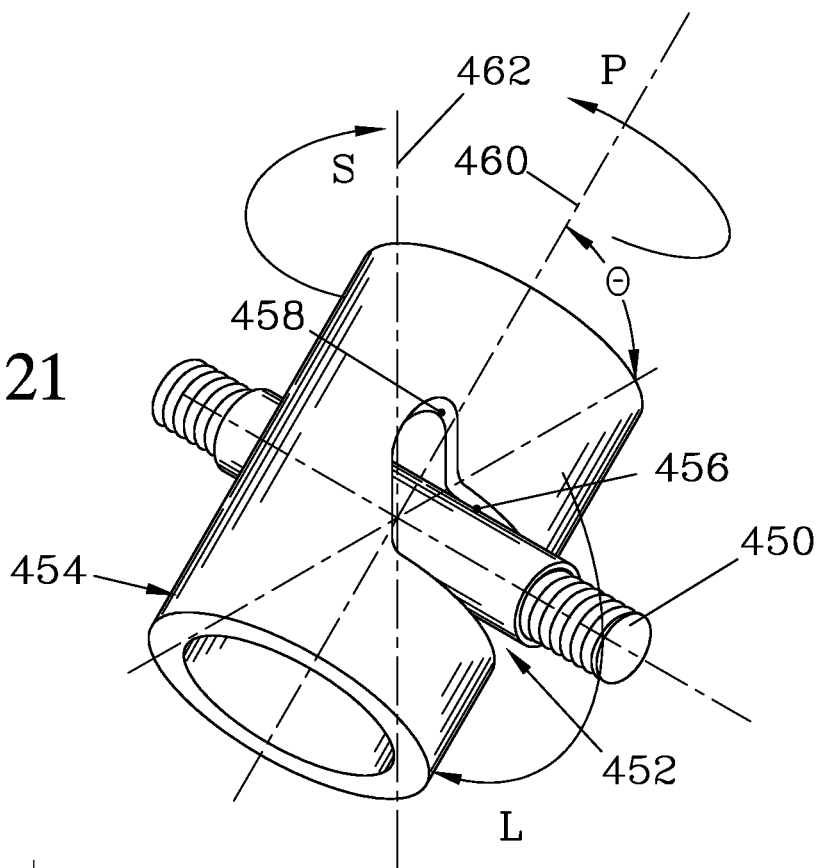
Figure 22:
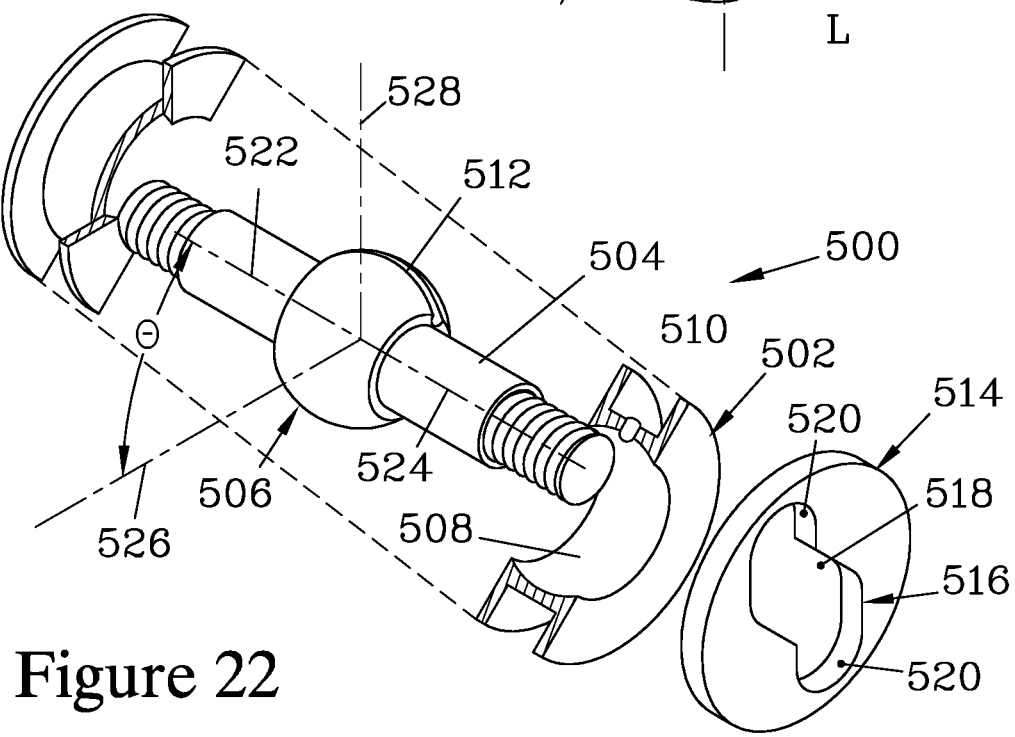

FIGS. 1-19 illustrate embodiments of steerable wheel assemblies that provide what can be characterized as a linear steering response to tilting, where increased tilting results in increased steering action throughout the expected range of tilting. FIGS. 20-22 and 37 & 38 illustrate some examples of non-linear steering responses, where increased tilting does not necessarily result in a corresponding increase in steering action; this non-linear response can be employed in steerable wheel assemblies, such as shown in FIGS. 20-22, but can also provide a benefit when employed in alternative lean-to-steer mechanisms, such as shown in FIGS. 23-36.

Figure 1:
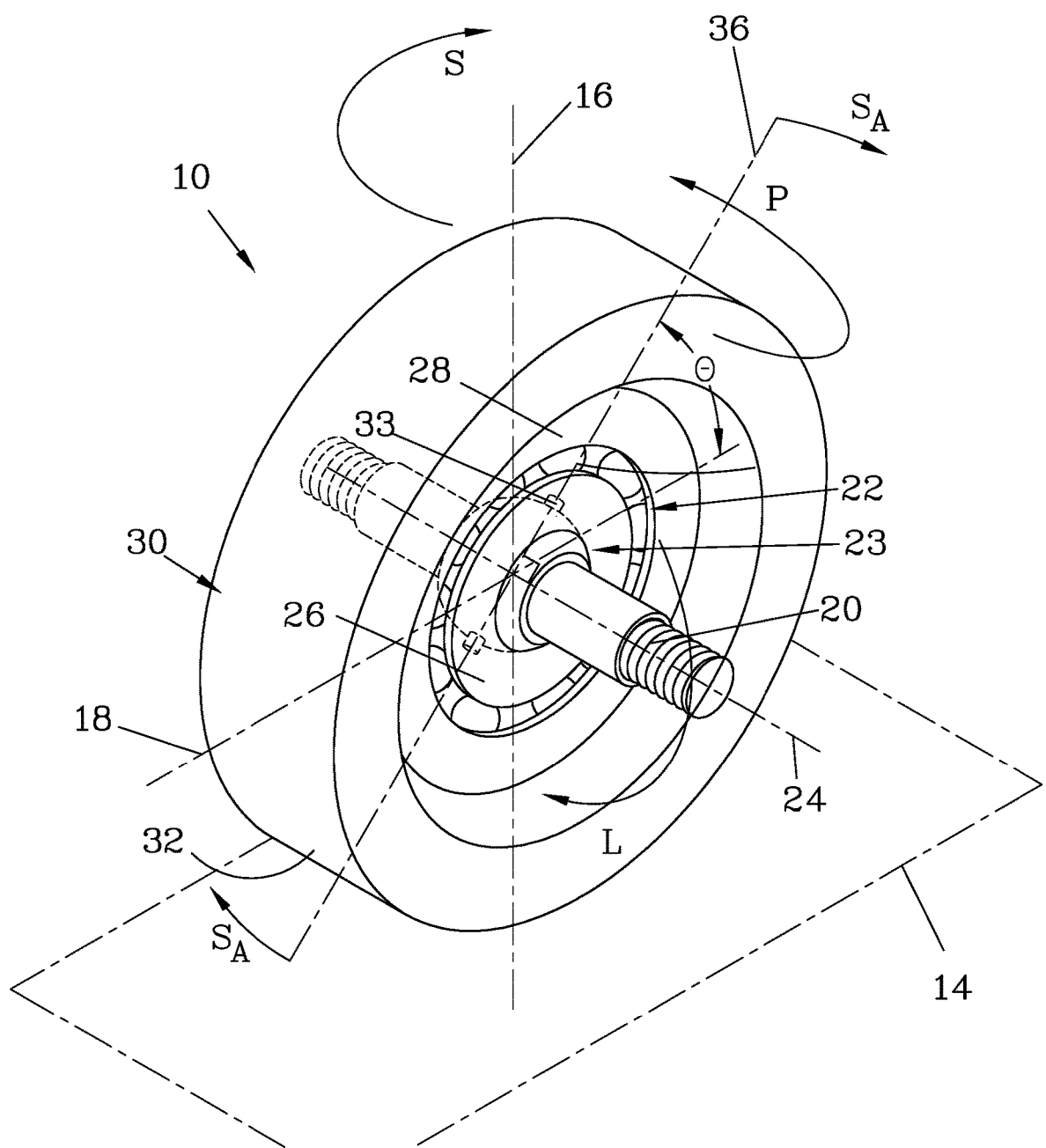
FIGS. 1-19 illustrate steerable wheel assemblies of the present invention that provide a linear steering response, and lean-to-steer devices incorporating these wheel assemblies.
Figure 2:
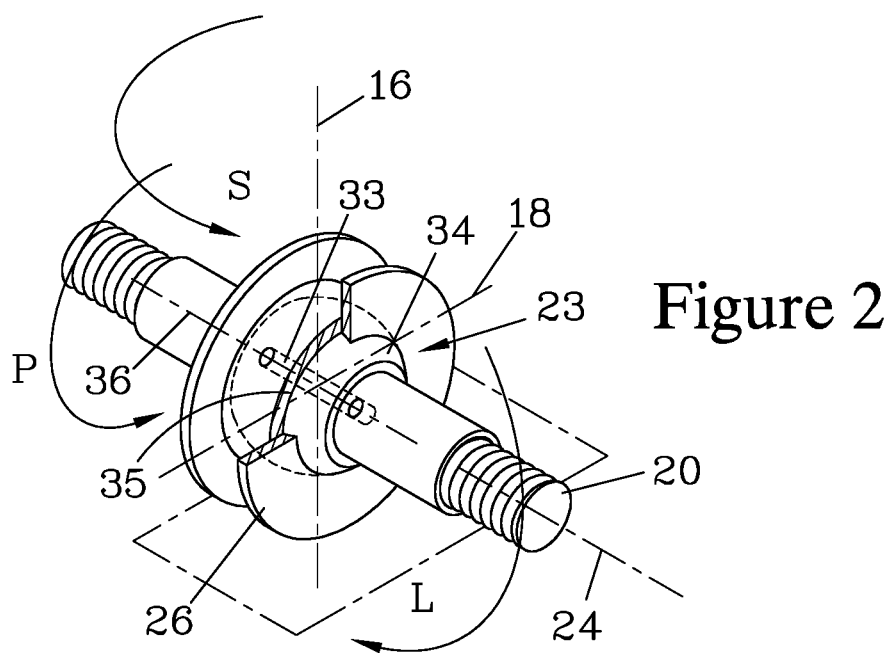
Figure 3:
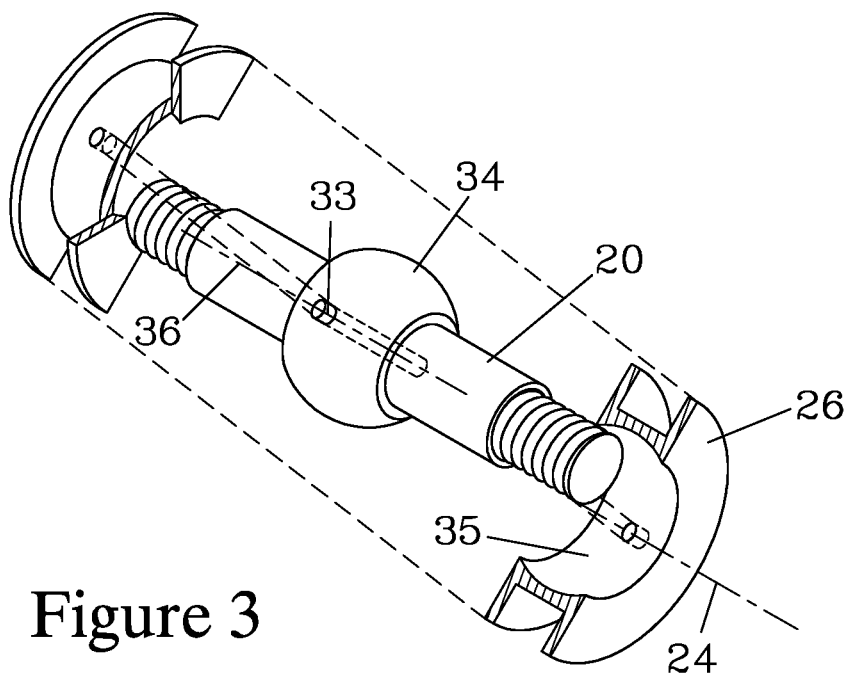
Figure 6:
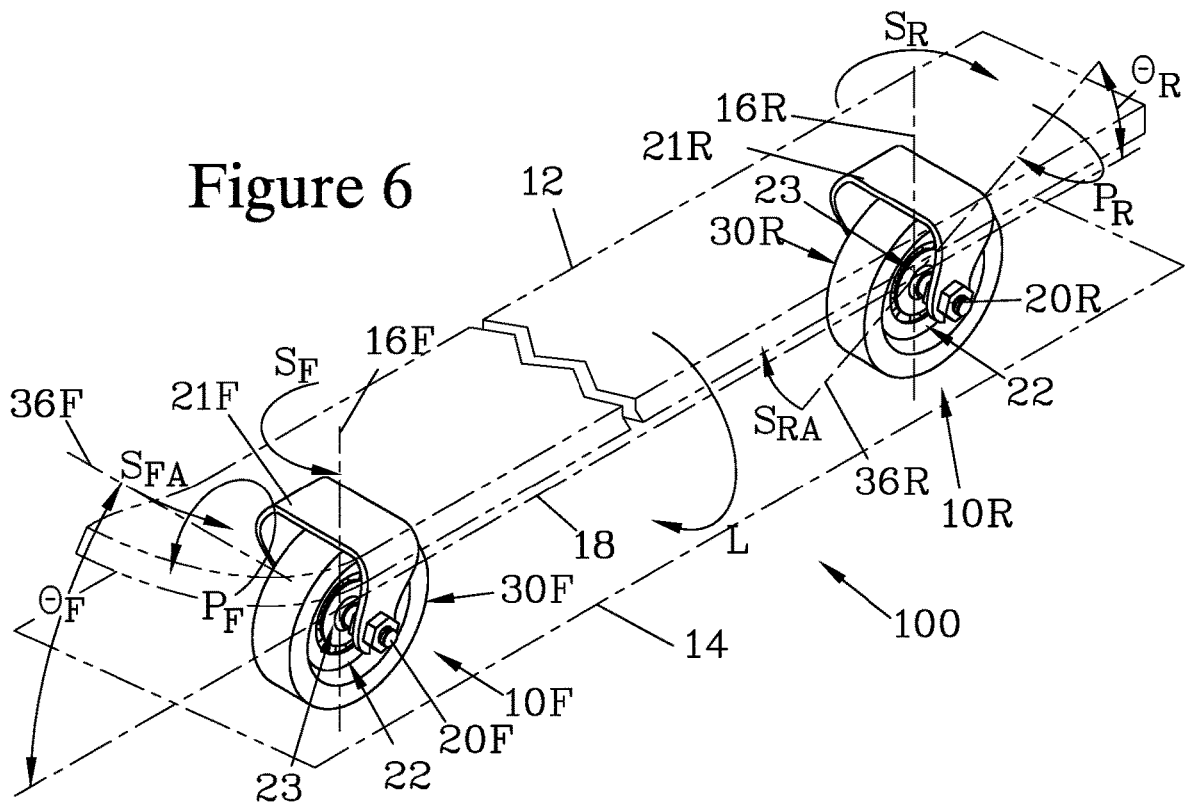

FIGS. 1-3 illustrate a steerable wheel assembly 10 for use in a lean-to-steer device having a body 12 (one example being shown in FIG. 6). When the device traverses a nominally horizontal surface 14, the assembly 10 provides steering about a nominally vertical steering axis 16 in response to leaning of the body 12 when the user supported on the body 12 shifts their weight; this weight shift creates a torque L about a nominally horizontal longitudinal axis 18. The assembly 10 has a shaft 20 that is maintained in a fixed position relative to the body 12 so as to extend perpendicular to the longitudinal axis 18. Typically, the shaft 20 is affixed to a mounting fork 21 (shown in FIG. 6), which in turn is affixed to the body 12. The shaft 20 extends generally horizontally, and is tilted about the longitudinal axis 18 away from horizontal when the user leans the body 12.

The assembly 10 employs a combination of a roller bearing 22 with a pivot joint 23. The roller bearing 22 has a roller bearing axis 24, about which an inner race 26 and an outer race 28 are free to rotate with respect to each other. Preferably, the roller bearing 22 is provided by a ball bearing to reduce friction, and a double row angular contact bearing is felt to be particularly suitable. The inner race 26 is mounted to the shaft 20 via the pivot bearing 23, as discussed below, while a wheel 30 is mounted to the outer race 28. The wheel 30 illustrated has a flat rim 32 that rests upon the horizontal surface 14, thereby maintaining the roller bearing axis 24 essentially parallel to the horizontal surface 14 regardless of the speed of the device.

The pivot joint 23 of the assembly 10 is formed from a spherical plain bearing with its motion limited by a pivot pin 33. As better shown in FIGS. 2 and 3, the spherical plane bearing has an inner spherical element 34 affixed onto the shaft 20 and an outer spherical socket 35 that is provided on the inner race 26. The pivot pin 33 limits motion between the spherical element 34 and the spherical socket 35 to pivotal motion about a pivot axis 36, and the pivot pin 33 is oriented such that the pivot axis 36 is perpendicular to the roller bearing axis 24 and inclined with respect to both the horizontal surface 14 and the longitudinal axis 18 by a pivot angle Θ. Because the orientation of the pivot pin 33 is set by the inner spherical element 34, the magnitude of the pivot angle Θ is set by the orientation of the shaft 20 when it is fixed with respect to the body 12.

By limiting the motion between the shaft 20 and the roller bearing 22, the pivot joint 23 constrains the motion of the shaft 20 such that tilting of the shaft 20 about the longitudinal axis 18 (indicated by the arrow L) forces the entire the roller bearing 22 to turn about the steering axis 16 axis (indicated by the arrow S). Because the pivot axis 36 is inclined, the shaft 20 cannot simply pivot about the longitudinal axis 18 when the user leans the body 12. The pivoting action is limited to movement about the pivot axis 36 (indicated by the arrow P), and thus the tilting movement of the shaft 20 can only be accommodated as a component of rotation about the pivot axis, with an additional component being motion about the steering axis 16, since motion of the roller bearing 22 and the wheel 30 is limited by the engagement of the flat wheel rim 32 with the underlying surface 14, which serves to maintain the roller bearing axis horizontal.

Figure 4:
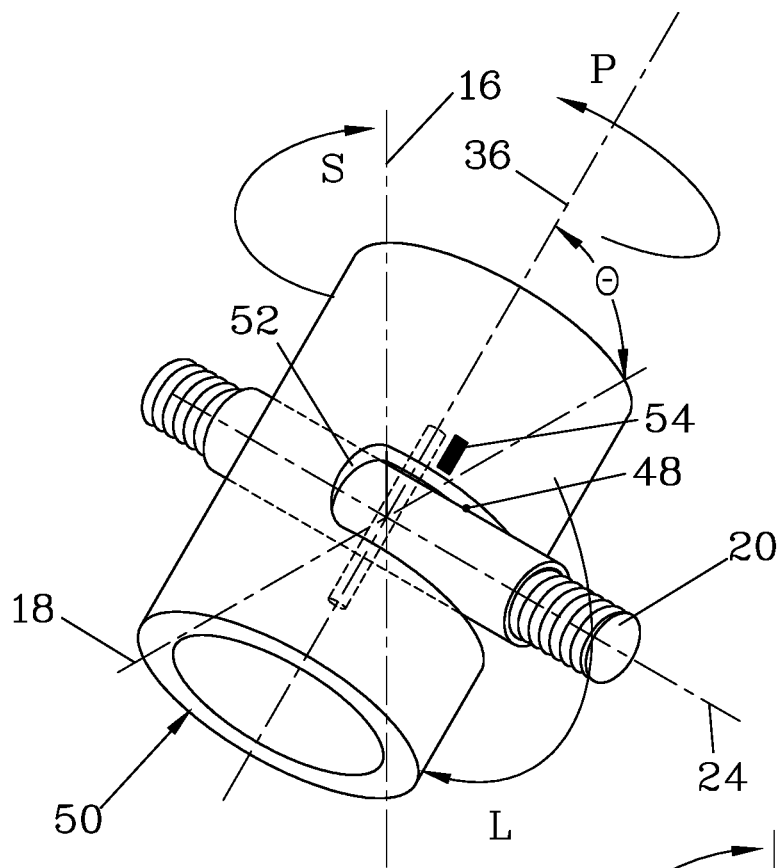
Figure 5:
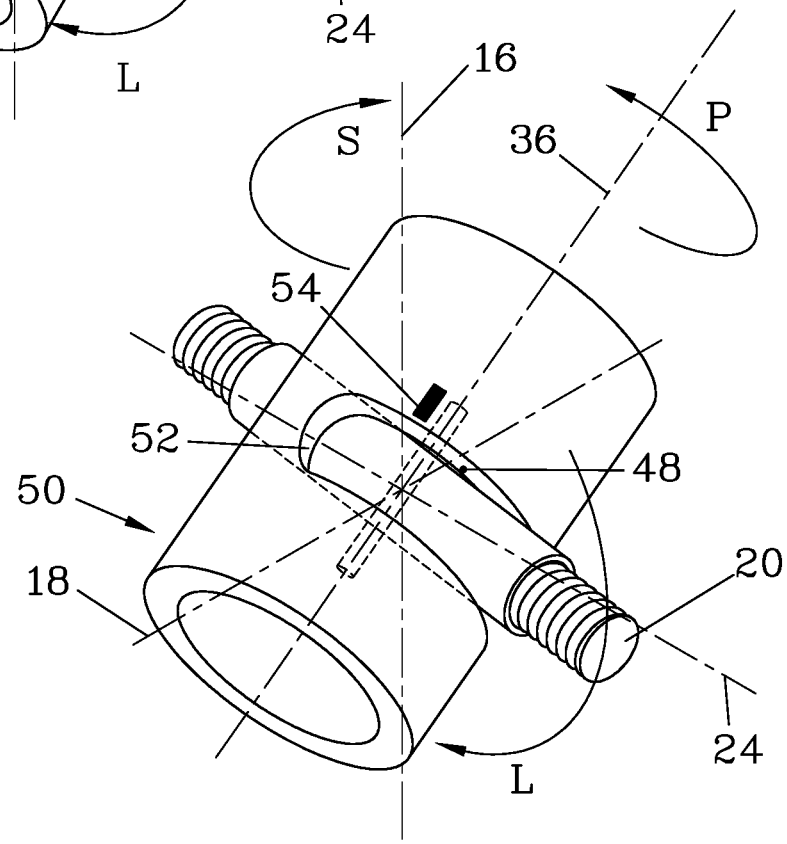

One visual representation of the effect of the pivot joint 23 is shown in FIGS. 4 and 5, where the constraint on the motion of the shaft 20 is represented by a slot 48 in a cylinder 50, where the cylinder 50 is symmetrical about the pivot axis 36 and the slot 48 extends in a plane that is perpendicular to the pivot axis 36. Thus, engagement with the slot 48 limits the shaft 20 to movement P about the pivot axis 36. When the user leans the body 12 (indicated by the arrow L), causing the shaft 20 to tilt about the longitudinal axis 18 away from horizontal (as shown in FIG. 5), it can be seen that this tiling is only possible if the shaft 20 applies a camming force against the slot 48, forcing the cylinder 50 to rotate about the pivot axis 36 (indicated by the arrow P), as illustrated by the change in position of a slot end 52 and a reference mark 54. However, the motion of the cylinder 50 is constrained, since the cylinder 50 represents the pivot joint 23 that is limited in motion by the engagement of the wheel 30 (shown in FIG. 1) with the surface 14. To accommodate the movement, the cylinder 50 must pivot about the steering axis 16 (indicated by the arrows S), thereby turning the wheel 30 to steer in the desired direction to turn the body 12 in the direction that the user is leaning. The rotation of the cylinder 50 also correspond to rotation of the pivot axis 36 (about which the cylinder is symmetrical) about the steering axis 16, as indicated by the arrows $S_A$.

The steerable wheel assembly 10 can be employed in a variety of lean-to-steer devices, including ski trainers, roller skates, skateboards, wheelbarrows, etc. Because the steering action is provided by the combination of the roller bearing 22 and the pivot joint 23 that are both centrally located within the wheel 30, the assembly 10 can be readily incorporated into a variety of devices; all that is required is a structure to which the shaft 20 can be affixed. This simplicity is in contrast to various prior art devices, where the wheel rotates on an axle that is attached with complex mounting structures to provide the steering action. One example of a device employing the assembly 10 is a ski trainer 100 shown in FIG. 6.

The ski trainer 100 employs two of the steerable wheel assemblies 10 shown in FIG. 1, attached to the body 12 which is formed in the shape of a snow ski. Each of the wheel assemblies (10F, 10R) is attached to the body 12 by a rigid fork bracket (21F, 21R), to which the shaft (20F, 20R)

is affixed. The simple structures of the attachment allows considerable freedom in the structure of the devices on which the assembly 10 can be employed, making it readily adaptable for training skis, skates, wheelbarrows, etc.

To provide the desired steering action for the trainer ski 100, the shaft 20F of the front assembly 10F is affixed to the front fork bracket 21F so as to set the inclination angle $\Theta_F$ of the front pivot axis 36F in the orientation as shown in FIGS. 2-3 (pivot axis inclined downwards with increasing distance from the observer), while the shaft 20R of the rear assembly 10R is affixed to the rear fork bracket 21R so as to set the inclination angle $\Theta r$ of the rear pivot axis 36R in the orientation as shown in FIG. 1 (pivot axis inclined upwards with increasing distance from the observer). When the body 12 is leaned as indicated by the arrow L, both the shafts (20F, 20R) also lean. In the front assembly 10F, the leaning of the front shaft 20F causes it to pivot about the front pivot axis 36F as indicated by the arrow $P_F$, causing a steering pivot of the front wheel 30F relative to the front shaft 20F as indicated by the arrow $S_F$, turning the front wheel 30F into the direction of the lean to guide the ski trainer 100 into a curve in that direction. This motion also causes rotation of the front pivot axis 36F about the front steering axis 16F, as indicated by the arrow $S_{FA}$. In the rear assembly 10R, leaning of the rear shaft 20R causes it to pivot about the rear pivot axis 36R as indicated by the arrow $P_R$; because the inclination of the rear pivot axis 36R is opposite that of the front pivot axis 36F, this pivoting action causes a steering pivot of the rear wheel 30R that is opposite that of the front wheel 30F, as indicated by the arrow $S_R$, this motion also causing rotation of the rear pivot axis 36R about the rear steering axis 16R, as indicated by the arrow $S_{RA}$. Thus, the rear wheel 30R is turned away from the direction of the lean, allowing the ski trainer 100 to curve in the direction guided by the front wheel 30F with a smaller turning radius. As discussed below with regard to FIGS. 8 and 9, in some cases the rear inclination angle $\Theta r$ measured from horizontal is set somewhat less the front inclination angle $\Theta_F$ such that the front wheel 30F turns more than the rear wheel 30R for a particular amount of leaning of the body 12. Additionally, both inclination angles ($\Theta_F$, $\Theta r$) can be adjusted to provide a desired degree of steering response to suit the intended use. Since the inclination angles ($\Theta_F$, $\Theta r$) are set simply by the attachment of the shafts 20 to the fork brackets 21, no complex structure is required to provide such adjustability. For typical skiing applications, setting each of the pivot axes (36F, 36R) at an angle ($\Theta_F$, $\Theta r$) of about 30°-60° from horizontal is preferred, depending on the distance between the wheel assemblies (10F, 10R).

Figure 7:
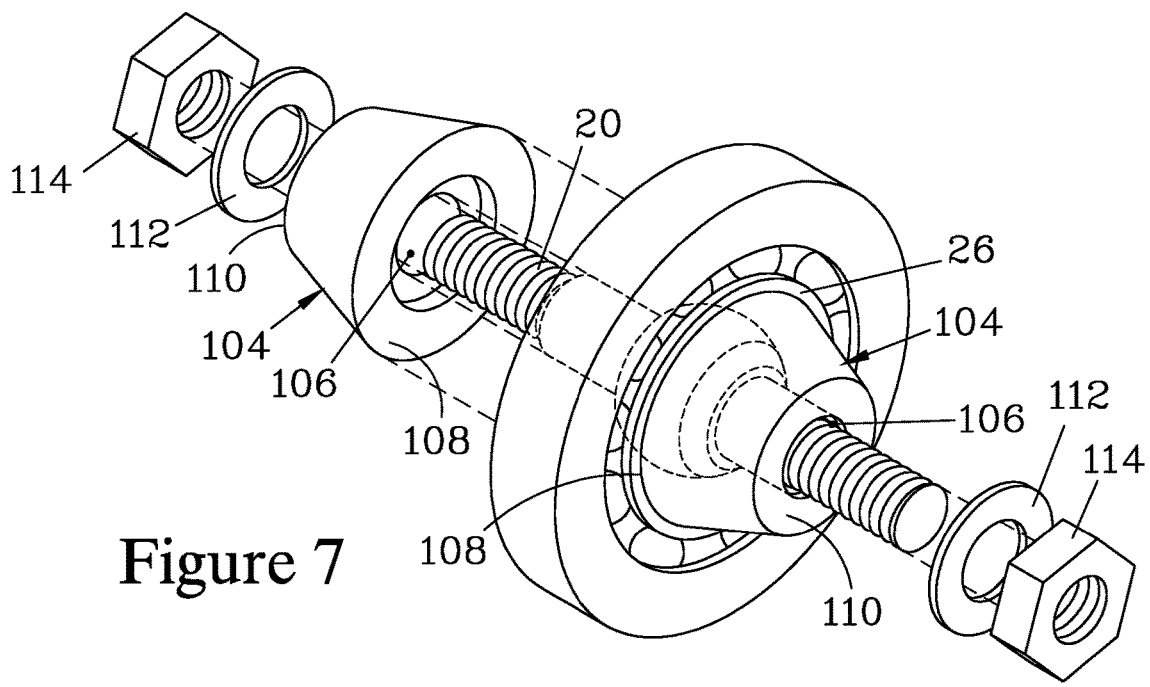

In addition to adjusting the steering response of the wheel 30 by mounting the shaft 20 so as to adjust the inclination angle $\Theta$ of the pivot axis 36, the response to leaning of the body 12 can be further adjusted by providing means to bias the shaft 20 to a neutral position where it extends along the roller bearing axis 24. One example of such biasing means is shown in FIG. 7, which illustrates two resilient bushings 104 that can be installed on the shaft 20. The bushings 104 are made of a resilient material such as a urethane elastomer, such as is conventionally used for bushings in skateboards.

Each of the bushings 104 has a shaft passage 106 therethrough, and terminates at a bushing inner face 108 and a bushing outer face 110. The bushing 106 is placed onto the shaft 20 with the bushing inner face 108 positioned to abut against the inner race 26 of the roller bearing 22. A bushing washer 112 is then placed onto the shaft 20 against the bushing outer face 110, and tightened against the bushing 106 by a bushing nut 114, which threadably engages the shaft 20. As the bushing nut 114 is tightened, the bushing 106 is compressed between the inner race 26 and the bushing washer 112. When the shaft 20 is moved away from its neutral position by leaning of the body 12 (as indicated by arrow L in FIG. 6), the bushing 106 is resiliently deformed, and provides a reaction force urging the shaft 20 back to its neutral (horizontal) position. The magnitude of the reaction force to the increasing tilt of the shaft 20 can be adjusted by the configuration and composition of the bushing 106 and, to a lesser degree, by the degree of compression of the bushing 106 between the inner race 26 and the bushing washer 112. Thus, the response can be readily adjusted to suit the desired conditions by replacing the resilient bushings 106 with alternative bushings having a different shape and/or composition. For some applications, it may be desirable to provide a time-dependent response by employing a bushing filled with a viscous material or which employs hydraulic control of its deformation; such a bushing should provide a stiff resistance to sudden deformation, but a softer response to more gradual deformation of the bushing. Similarly bushings that are keyed with respect to the shaft so as to have a defined orientation thereon could be employed, in which case the bushings can be provided with a face for engaging the inner race that is inclined with respect to a plane normal to the roller bearing axis. Such an inclined face would allow some variation in the steering action in response to weight distribution on the body, such that a deweighted body could be made to steer slightly to the outside of a curve.

Figure 8:
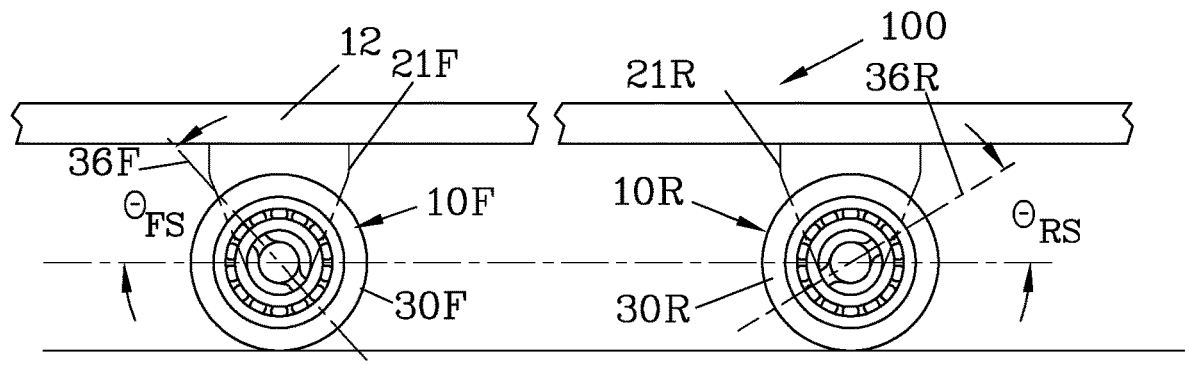
Figure 9:
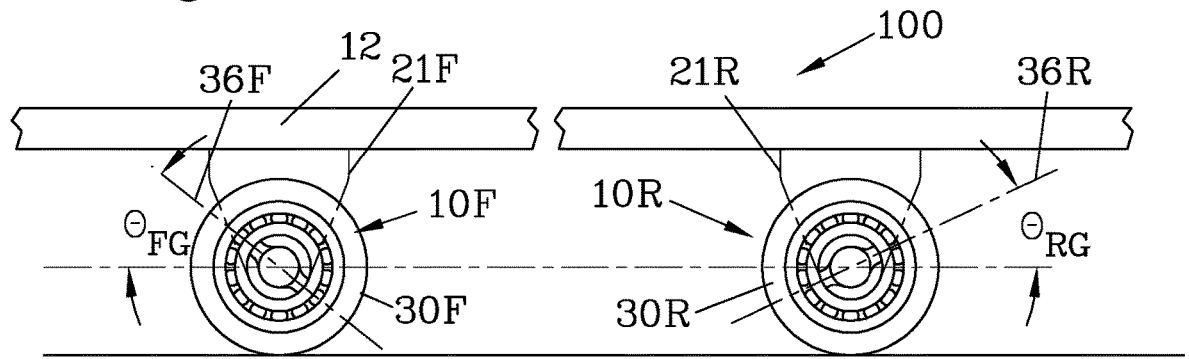

As noted above in the discussion of FIG. 6, the steering response of a device such as the ski trainer 100 can be adjusted by altering the inclination angles ($\Theta_F$, $\Theta r$) of the front and rear pivot axes. FIGS. 8 and 9 illustrate two examples of typical adjustments that could be made to the ski trainer 100 to suit different skiing actions. As shown in FIG. 8, the ski trainer 100 has been set for a slalom-type skiing action, where tight turning in response for leaning is desirable. The front wheel assembly 10F has been attached to the front fork bracket 21F to set a relatively steep front inclination angle $\Theta_{FS}$ for the front pivot axis 36F. In this case, to simulate a snow ski with greater carving action at the front, the rear wheel assembly 10R has been attached to the rear fork bracket 21R to set a somewhat less steep rear inclination angle $\Theta_{RS}$ for the rear pivot axis 36R. Because of the steep angle $\Theta_{FS}$, the front assembly 10F provides a strong steering action of the front wheel 30F in response to leaning of the body 12, thereby guiding the ski trainer 100 into a tight curve, while the response of the rear wheel 30R is somewhat less. It should be noted that some snow skis are designed to provide a greater carving effect of the rear of the ski, and to simulate the action of such skis, the pivot angles of the front and rear may be the same. Alternatively, in some applications the steering action of the rear wheel may not be needed, in which case the rear wheel could be mounted conventionally rather than being a part of a wheel assembly of the present invention.

In contrast, FIG. 9 shows the ski trainer 100 when set for a general downhill skiing action, where a more gradual turning action is desired. To achieve this, the front wheel assembly 10F is attached to set a shallower front inclination angle $\Theta_{FG}$ (where $\Theta_{FG}<\Theta_{FS}$) for the front pivot axis 36F, and the rear wheel assembly 10R has been attached to set a still less steep rear inclination angle $\Theta_{RG}$ for the rear pivot axis 36R. Because of the smaller angle $\Theta_{FG}$, steering response of the front assembly 10F is less than that when configured as shown in FIG. 8, providing a more gradual steering action of the front wheel 30F in response to leaning of the body 12. In some cases, the user may wish to deactivate one or both of the assemblies (typically the rear assembly), in which case a removable clip that can be temporarily attached to prevent motion between the shaft and the inner race could be provided.

Figure 10:
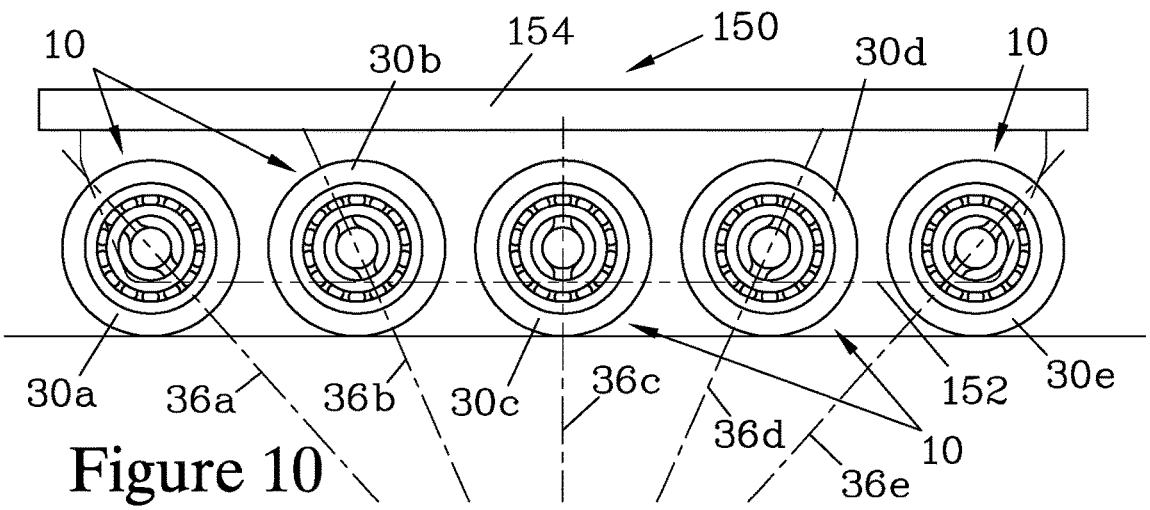

FIG. 10 illustrates a series of steerable wheel assemblies 10 employed in an alternative application, in-line roller skate 150. In the skate 150, the wheel assemblies 10 are all mounted to a common bracket 152 and oriented such that their pivot axes (36*a*-36*e*) are arranged to steer the wheels (30*a*-30*e*) such that they are aligned along the circumference of a circle in response to leaning of a skate body 154. This action of the wheels (30*a*-30*e*) is similar to that of the wheels of the skate taught in U.S. Pat. No. 5,398,949, incorporated herein by reference. With this arrangement, the pivot axes (36*a*-36*e*) appear to radiate from a common point located below the skate 150.

Figure 11:
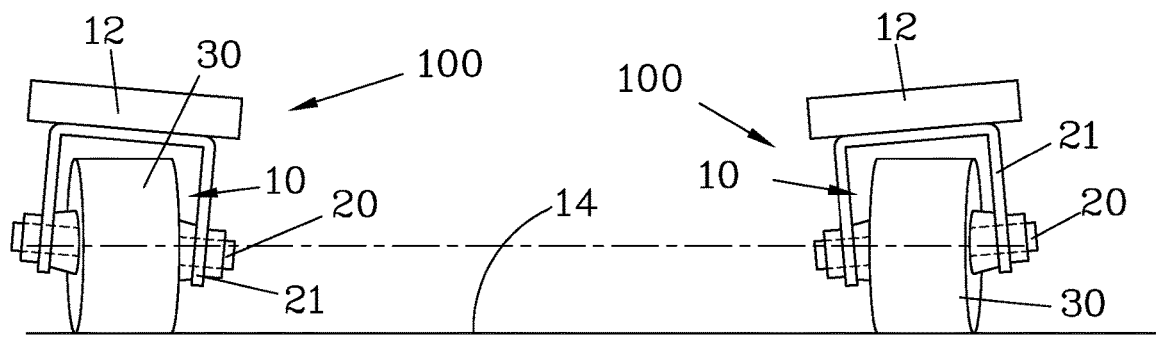

FIG. 11 illustrates one issues that can arise when a user employs a pair of ski trainers 100. Frequently, due to the stance of the user, the bodies 12 of the ski trainers 100 are canted with respect to the underlying surface 14 when the user is not leaning. As shown in FIG. 11, if this canting is not compensated, it results in the shafts 20 being inclined from their neutral horizontal orientation, and thus results in the wheels 30 steering in directions that impede the ability of the user to travel straight. Similarly, when leaning to one side to turn into a curve, the shafts 20 of the ski trainer 100 in the direction of the lean will be tilted at less of an angle than those on the side the user is leaning away from, resulting in the wheels 30 on the outside of the curve steering to track along a sharper curve than the wheels 30 on the inside of the curve. To avoid these problems, it is desirable for the ski trainer 100 to allow the shafts 20 of the steerable wheel assemblies 10 to be mounted such that the shafts 20 remain horizontal when the user is not leaning to one side, but has a stance such that the bodies 12 of the ski trainers 100 are canted while the user remains upright.

Figure 12:
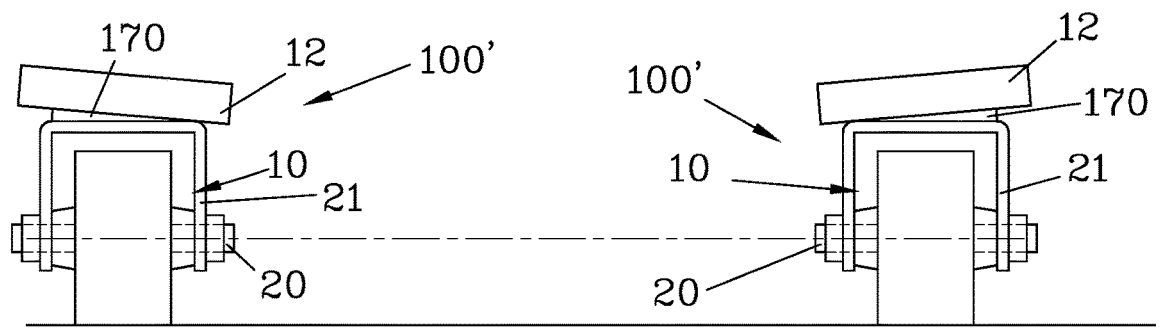

FIG. 12 illustrates a pair of ski trainers 100' that employ one scheme for accommodating the canting effect shown in FIG. 11. In the ski trainers 100', the fork brackets 21 are attached to ski bodies 12 with shims 170 interposed between the fork brackets 21 and the bodies 12; these shims 170 serve to angle the fork brackets 21 relative to the bodies 12, thereby providing a desired degree of cant for the bodies 12 relative to the shafts 20, and allowing the shafts 20 to remain horizontal while the bodies 12 are canted to match the stance of the user. While shims 170 are shown for purposes of illustration, it should be appreciated that the fork brackets could be formed so as to incorporate a cant angle when affixed directly to the bodies 12, or shims could be incorporated into the bindings that secure ski boots worn by the user onto the body 12. While this approach accommodates the cant of the bodies 12 for the stance of a particular user, the lack of adjustability makes this scheme poorly suited for applications where the ski trainers 100 may be used by multiple users, such as in a rental situation.

Figure 13:
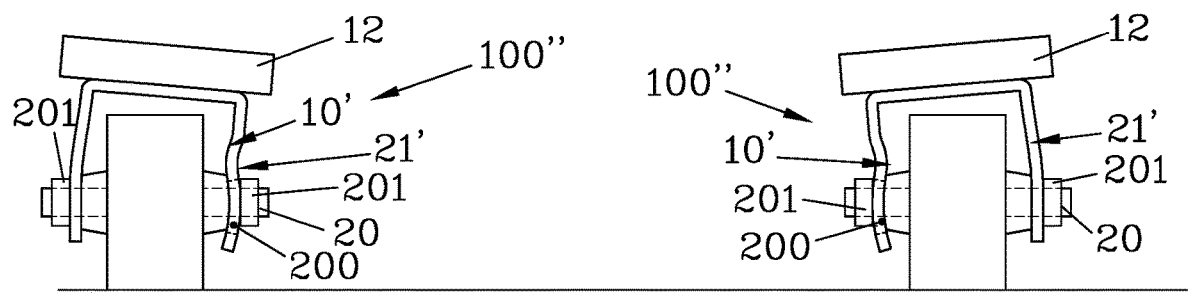

To allow the cant angle to be adjusted to suit multiple stances, the degree of cant should be adjustable. FIG. 13 illustrates a pair of ski trainers 100" that employ fork brackets 21' that allow the shafts 20' to be affixed thereto at an angle, thereby providing the effect of a bracket that incorporates an adjustable degree of shimming. One simple structure for providing this range of angles in the attachment is for at least one end of the shaft 20' to pass through a vertically-elongated slot 200 on the fork bracket 21', as better shown in FIG. 14. The vertically-elongated slot 200 allows the point of attachment of the shaft 20' to the fork bracket 21' to be adjusted. When such a vertically-elongated slot 200 is provided, the fork bracket 21' should be slightly arced to avoid off-axis forces when the nuts 201 are tightened to secure the shaft 20' to the fork bracket 21'.

Figures 14, 15:
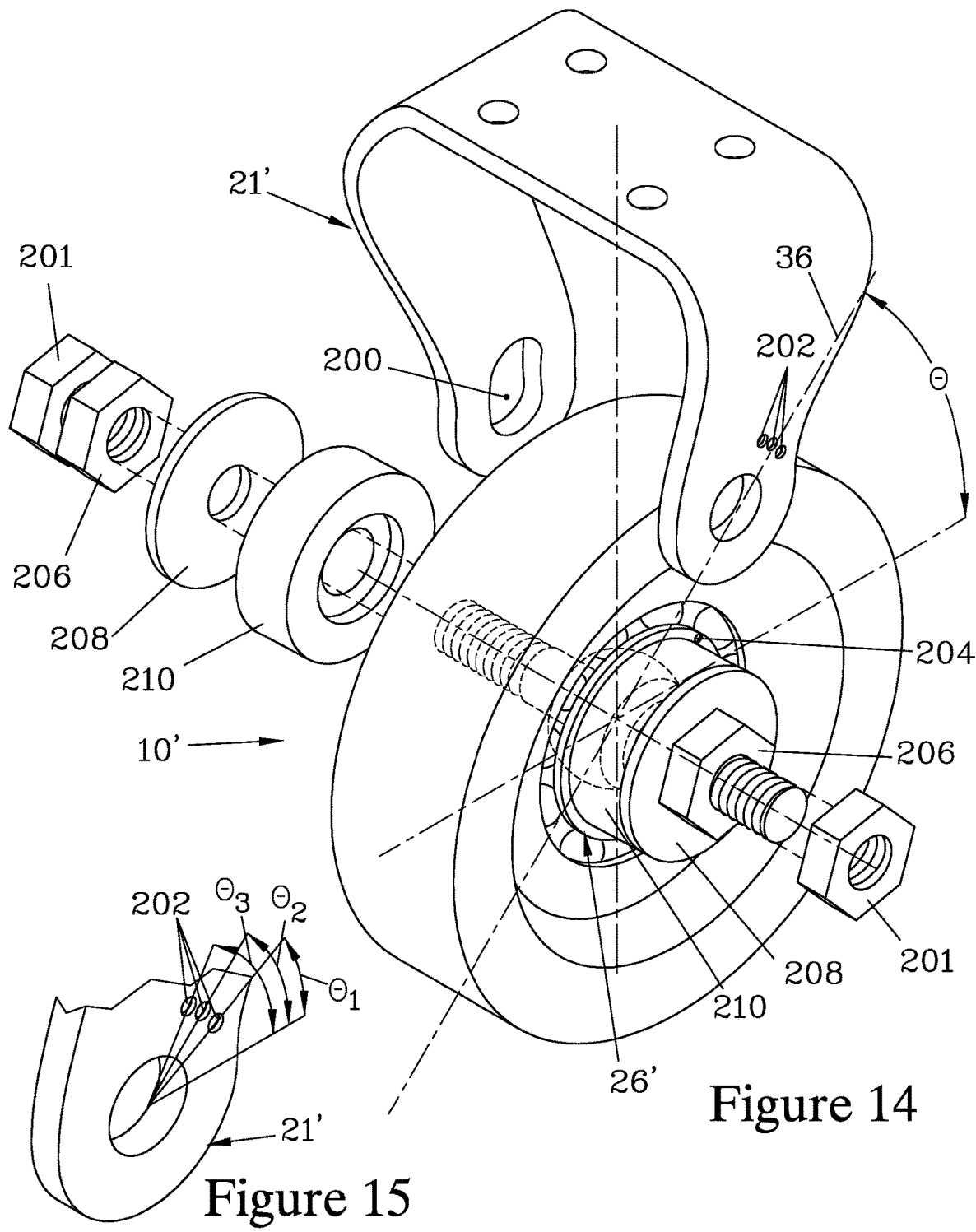

As shown in FIGS. 14 and 15, the fork bracket 21' also includes bracket index marks 202 that aid the user in setting a desired inclination angle Θ of the pivot axis 36 to provide a desired steering response appropriate for the intended type of skiing. As shown in FIG. 15, the bracket index marks 202 correspond to three different inclination angles ($\Theta_1, \Theta_2, \Theta_3$) to suit three different steering responses; for example, the first pivot inclination $\Theta_1$ may be provide a gradual steering response well suited for general downhill skiing, the somewhat steeper pivot inclination $\Theta_2$ may provide a steering response well suited for giant slalom skiing, and the third pivot inclination $\Theta_3$ may be steeper to provide a sharp steering response well suited for slalom skiing. The inner race 26' is provided with a pivot index mark 204 that is aligned with the pivot axis 36; when the shaft 20 is affixed to the fork bracket 21', the user can match the pivot index mark 204 to the desired bracket index mark 202 for the type of steering action desired, or to any intermediate position. An adjustment mechanism could be added to aid the user in setting the pivot angle to provide the desired steering response with greater precision and repeatability.

FIG. 14 also shows bushing nuts 206 and bushing washers 208 that are employed to secure resilient bushings 210 on the shaft 20'. When tightened, the bushing nut 206 and bushing washer 208 forcibly engage the resilient bushing 210 against the inner race 26' of the roller bearing 22' to provide a centering action that biases the shaft 20' to a position where it is horizontal and extends along the roller bearing axis 24. The degree of the centering force can be adjusted by tightening or loosening the bushing nuts 206 to change the degree of compression of the resilient bushing 210.

Figure 16:
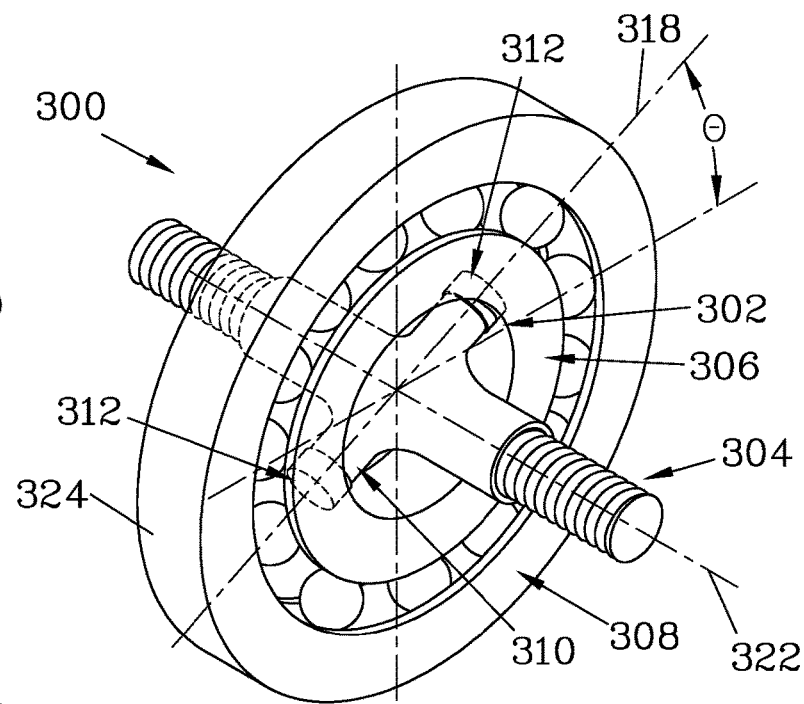
Figure 17:
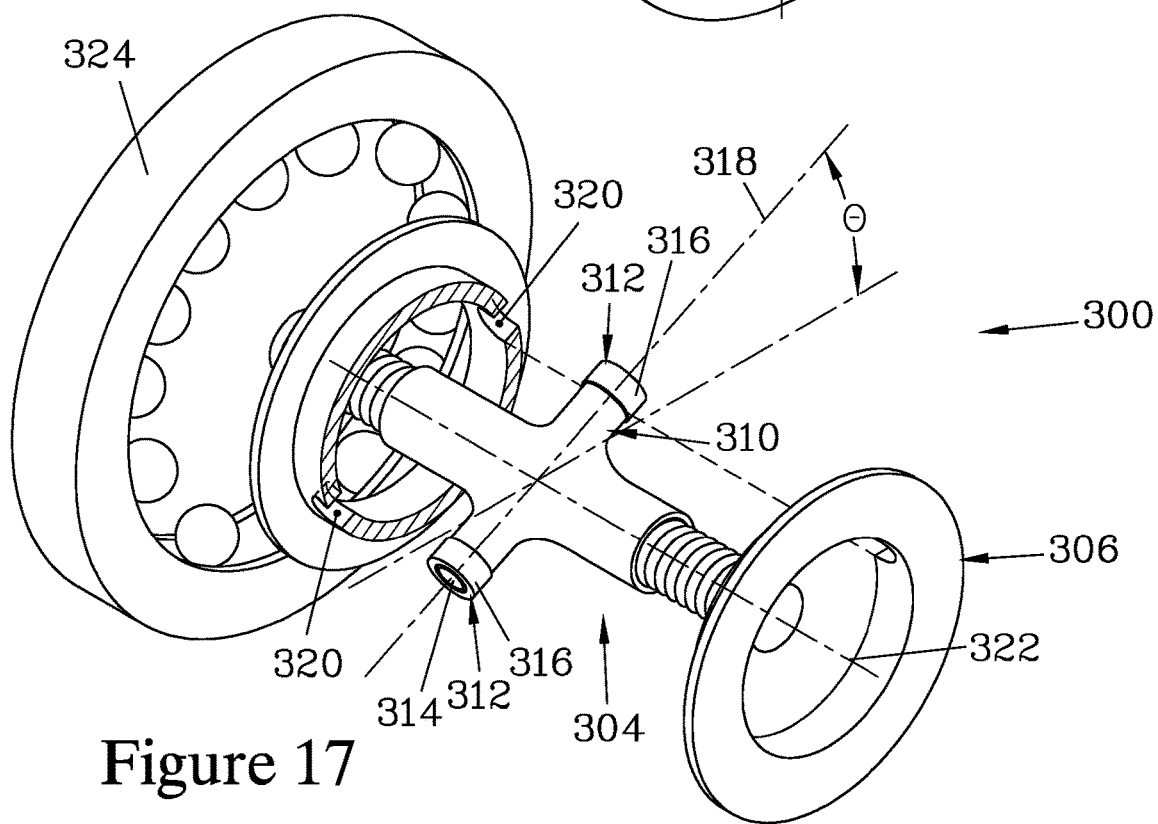

FIGS. 16 and 17 illustrate components of a steerable wheel assembly 300 that forms another embodiment of the present invention, and which employs an alternative structure for providing a pivot joint 302 between a shaft 304 and a roller bearing inner race 306 of a roller bearing 308. FIG. 16 shows the components assembled, while FIG. 17 shows the components exploded and partially sectioned. The shaft 304 of this embodiment is affixed to a trunnion member 310 that extends perpendicular to the shaft 304 and has ends that are provided with trunnion member bearings 312. As shown in FIG. 17, the trunnion member bearings 312 are aligned and provide free rotation between the trunnion member bearing inner race 314, which can be fixed to the trunnion member 310, and a trunnion member bearing outer race 316 about a pivot axis 318. The roller bearing inner race 306 is formed with a pair of bearing seats 320 (better shown in FIG. 17) that are configured to receive the trunnion member bearing outer races 316, and position them such that the pivot axis 318 is perpendicular to a roller bearing axis 322, which is the axis of rotation between the roller bearing inner race 306 and a roller bearing outer race 324. The shaft 304 is affixed to a fork bracket or similar fixture to position the trunnion member 310 so as to set the pivot axis 318 at a desired inclination angle Θ with respect to the horizontal. The reduced friction provided by the trunnion member bearings 312 is expected to provide greater freedom of motion between the shaft 304 and the inner roller bearing race 306 to provide smoother steering action under heavy loads.

Figure 18:
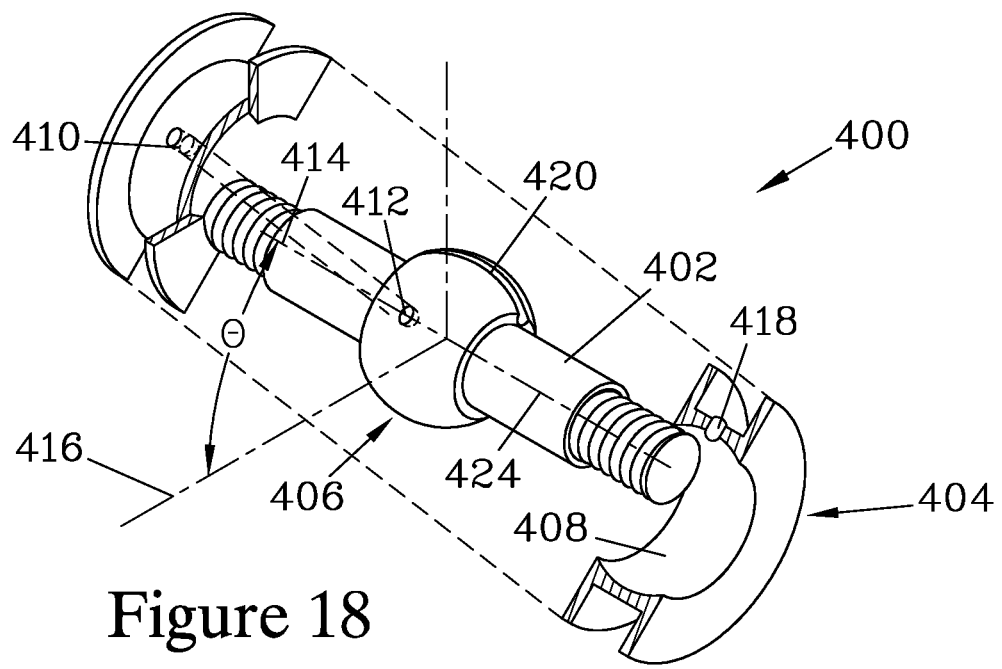

FIG. 18 illustrates components of a steerable wheel assembly 400 that forms another embodiment of the present invention, and which employs an alternative motion-limiting structure for providing a pivoting action between a shaft 402 and an inner race 404 of a roller bearing having and outer race (not shown) to which a wheel is attached. The motion-limiting structure again employs a spherical plain bearing having an inner spherical element 406 affixed onto the shaft 402 and an outer spherical socket 408 that is provided on the inner race 404. A first pin 410 extending inwardly from the spherical socket 408 engages a circular recess 412 on the inner spherical element 406, defining a first pin axis 414 in a similar manner to the pivot pin 33 and pivot axis 36 shown in FIGS. 2 and 3. The shaft 402 is affixed to the body of the device so as to position the circular recess 412 such that it sets the first pin axis 414 inclined with respect to the underlying horizontal surface and to a longitudinal axis 416 by a first pin angle $\Theta$.

A second pin 418 also extends inwardly from the spherical socket 408, and engages a guide groove 420 on the inner spherical element 406; the guide groove extends circumferentially, residing in a plane to which the first pin axis 414 is perpendicular. The guide groove 420 is also shown in FIG. 19. The motion of the steerable wheel assembly 400 in response to leaning of a body to which the shaft 402 is affixed is similar to that of the steerable wheel assembly 10 discussed above.

In the embodiments discussed previously, the steering response of the wheel to leaning of the shaft can be characterized as linear; in such cases, as the tilting of the shaft increases, the rotation of the wheel about the vertical steering axis increases. While this provides a desirable response for many applications, there are some applications where a non-linear response is preferable, such that the steering action of the wheel is not directly responsive to the tilting of the shaft.

One situation where a non-linear response may be desirable is to provide a rear wheel that is limited in the degree of tilting of the shaft that it can accommodate while retaining its wheel rim on the surface being traversed.

FIG. 20 illustrates an inner spherical element 406' that employs an alternative guide groove 420' that is truncated, having groove ends 422 that engage the second pin 418 to limit the range of pivoting motion about the first pin axis 414. When the shaft 402 is tilted far enough to bring the second pin 418 into engagement with one of the groove ends 424, the engagement limits further steering motion of the inner race 404. At such point, further tilting of the shaft 402 cannot be accommodated by the steering motion while retaining a roller bearing axis 424 (shown in FIG. 18) horizontal, and thus the roller bearing axis 424 must be tilted off horizontal to accommodate further leaning. This results in a wheel rim (not shown) mounted to rotate about the inner race 404 being tilted with respect to the underlying surface, rather than remaining flat. The reduced contact area of the wheel rim reduces friction and allows the tilted wheel rim to more easily skid over the underlying surface, rather than rolling across it. This skidding action is frequently desirable for the rear wheel of a two-wheeled device, to allow the operator to turn more tightly than if the rear wheel were to track the path of the front wheel only through steering action. An alternative scheme to providing limited tilting may be to provide skid elements on the body or on the shaft that are brought into engagement with the ground surface when the body has been leaned sufficiently far; however, this scheme may provide unreliable response when employed on uneven ground surfaces.

Another situation where a non-linear response may be desirable is to provide a lean-to-steer device that more closely simulates the action of snow skis which are designed to carve at a specified turn radius; such skis are shaped such that they curve increasingly with increased leaning up to a point, and thereafter track along a specified radius of curvature independently of the degree of leaning. The steerable wheel assembly of the present invention can be designed such that the motion-limiting structure that connects the inner race to the shaft provides such a non-linear steering response, where the response to increased leaning is essentially linear up to a set point, and thereafter increased leaning is accommodated without a corresponding increase in steering action.

FIG. 21 provides a visual representation of such a response, in a manner similar to the visual representation of the linear response shown in FIGS. 4 and 5. The constraint on motion of a shaft 450 is represented by a slot 452 in a cylinder 454. Unlike the slot 48 shown in FIGS. 4 and 5, which is a linear slot, the slot 452 is a segmented slot having a central segment 456 and two vertical end segments 458, only one of which is visible.

The central segment 456 extends in a plane that is perpendicular to a pivot axis 460 about which the cylinder 454 is symmetrical (the same relationship as the slot 48 in the cylinder 50). When the shaft 450 is within a specified range of inclination to horizontal, it engages the central segment 456 and is limited to movement P about the pivot axis 460. As the body to which the shaft 450 is affixed is tilted, the resultant tilting of the shaft 450 can only be accommodated if the shaft 450 applies a camming force against the central segment 456, forcing the cylinder 454 to rotate about the pivot axis 460 (indicated by the arrow P). Again, since the motion of the cylinder 454 is constrained by the engagement of a wheel rim with the underlying surface, this rotation of the cylinder 454 causes the cylinder 454 to pivot about a vertical steering axis 462 (indicated by the arrows S). The steering action when the shaft engages the central segment 456 is the same as that discussed above with regard to FIGS. 4 & 5. Because the steering action provided is a linear response, the central segment 456 is considered to guide the shaft 450 along a functionally linear path, even though the central segment 456 itself is curved by its being formed on the surface of a cylinder. Similarly, arcuate guide slot segments formed on spherical surfaces can be considered as guiding an element engaged therewith along a functionally linear path.

As tilting of the body increases, the cylinder 454 eventually rotates far enough for the shaft 450 to reach one of the vertical end segments 458. At this point, the vertical end segment 454 allows the shaft 450 to simply tilt to accommodate further leaning, without causing further rotation of the cylinder 454 and thus without further steering motion about the steering axis 462.

FIG. 22 illustrates a steerable wheel assembly 500 that provides one example of a motion limiting structure for providing a non-linear steering response such as visually represented in FIG. 21. The assembly 500 has an inner race 502 of a roller bearing and a shaft 504, where the shaft 504 has an inner spherical element 506 affixed thereon, which engages an outer spherical socket 508 that is provided on the inner race 502. A pin 510 serving as a first guide element extends inwardly from the spherical socket 508 and engages a groove 512 in the inner spherical element 506, the groove serving as a first motion-limiting element. The engagement of the pin 510 in the groove 512 limits the motion between the shaft 504 and the inner race 502, preventing rotation of the inner race 502 about the shaft 504. However, the inner race 502 is free to rotate about the pin 510, and is free to rotate in such a manner as to move the pin 510 along the groove 512; these combined rotational motions provide freedom for the inner race 502 to pivot with respect to the shaft 504 so as to accommodate a wide range of motion, rather than being limited to only pivoting about a single axis.

To limit the motion between the inner race 502 and the shaft 504 to provide the desired steering response, a guide plate 514 is affixed to the inner race 502. The guide plate 514 has a guide slot 516 therein, which serves as a second motion-limiting element that engages the shaft 504 to limit the relative motion of the inner race 502 with respect to the shaft 502, the shaft 502 serving as a second guide element. The guide slot 516 shown has a central segment 518 and two vertical end segments 520. The central segment 518 is inclined with respect to the horizontal, and is maintained in such orientation by the engagement of the pin 510 on the inner race 502 with the groove 512 in the inner spherical element 506. This engagement prevents rotation of the inner race 502 (to which the guide plate 514 is affixed) about the shaft 504, and the shaft 504 in turn is affixed to the body of the device to which the steerable wheel assembly 500 is mounted.

The inclined central segment 518 limits motion between the inner race 502 and the shaft 504 to pivoting motion that moves the shaft 504 along the central segment 518, which effectively limits the motion to pivoting about a central segment pivot axis 522 that is perpendicular to a roller bearing axis 524 of the inner race 502 and is inclined with respect to both the underlying horizontal surface and a longitudinal axis 526 by a central segment pivot angle Θ. This limitation on the relative motion of the inner race 502 and the shaft 504 causes the inner race 502 to steer about a vertical steering axis 528 in order to move the shaft 504 along the central segment 518 to accommodate tilting of the shaft 502 due to leaning.

However, when tilting of the shaft 504 is sufficient to reach the end of the central segment 518, the shaft 504 engages one of the vertical end segments 520, and becomes free to tilt without causing any steering motion of the inner race 502 about the steering axis 528. Thus, the angular position of the inner race about the steering axis 528 remains constant when the shaft 504 is in the vertical end segment 520. Thus, the guide slot 516 engages the shaft 502 so as to direct the shaft 502 along a segmented path, rather than a linear path.

It should be appreciated that the steering response of the inner race 502 to tilting of the shaft 504 in this embodiment is controlled by the configuration of the guide slot 516 in the guide plate 514, and thus the response can be altered by replacing the guide plate 514 affixed to the inner race 502 with an alternative guide plate having a different guide slot configuration. The response could also be altered by allowing the position and/or inclination of the guide plate on the inner race to be adjusted. While the guide slot shown is provided in a plate, the slot could be provided in an alternative structure, such as a semi-spherical member affixed to the inner race.

Figure 23:
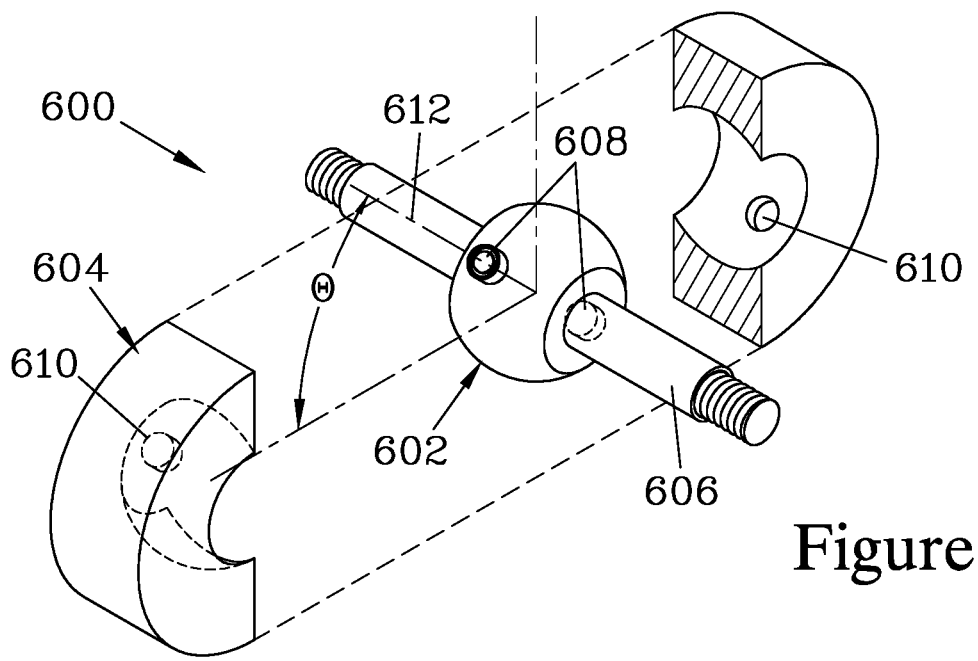
Figure 24:
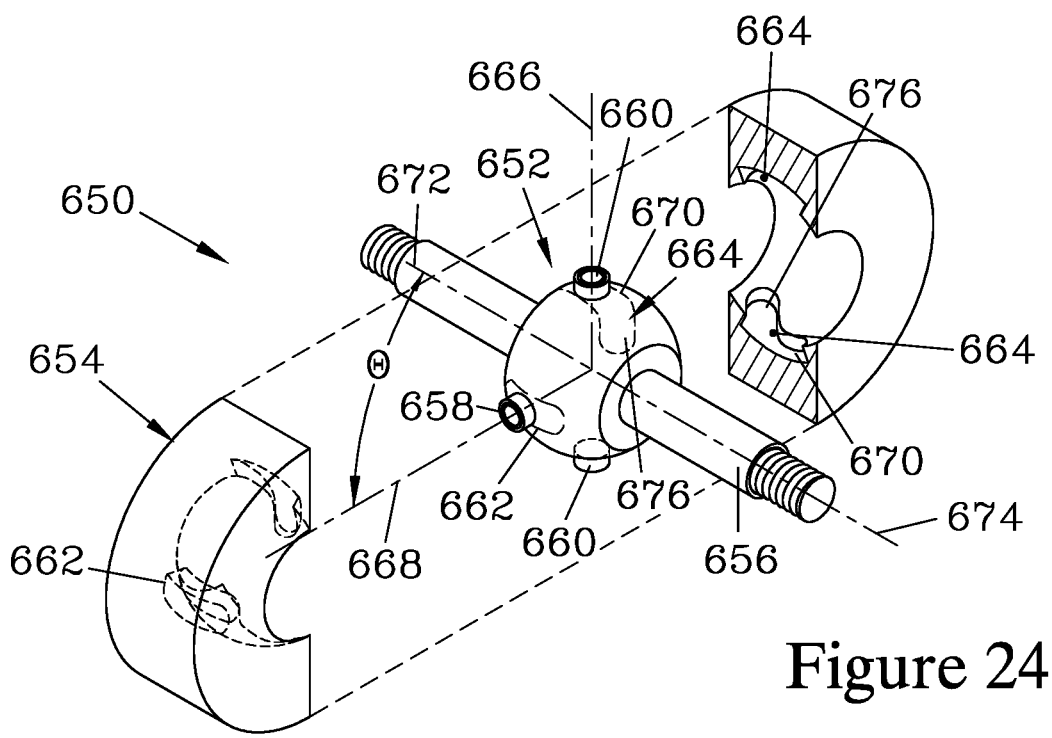

An alternative scheme to providing guide elements and corresponding motion-limiting elements to provide a desired steering response between spherical bearing elements is illustrated in FIGS. 23 and 24, with FIG. 23 illustrating a linear response lean-to-steer mechanism, and FIG. 24 illustrating a non-linear response lean-to-steer mechanism. In these embodiments, ball-bearing guide elements are provided on the inner spherical element, and engage guide tracks provided on the spherical socket which serve as motion-limiting elements; this is a reverse of the embodiments shown in FIGS. 18-20 where pins extending from the spherical socket engage grooves in the spherical element.

FIG. 23 shows a linear response steering mechanism 600 having an inner spherical element 602 rotatably mounted in an outer spherical socket 604, and affixed onto a shaft 606. The inner spherical element 602 is provided with an opposed pair of guide bearings 608, which engage a pair of bearing seats 610 in the spherical socket 604, limiting motion of the spherical element 602 with respect to the spherical socket 604 to pivoting motion about a pivot axis 612. This limitation to pivotal motion provides a linear lean-to-steer response similar to that provided by the steering mechanism 300 shown in FIGS. 16 and 17.

In contrast to the steering mechanism 600, FIG. 24 shows a steering mechanism 650 that provides a non-linear steering response to leaning. The steering mechanism 650 again has an inner spherical element 652 rotatably mounted in an outer spherical socket 654, and affixed onto a shaft 656. However, in this embodiment the inner spherical element 652 is provided with a first guide bearing 658, and a pair of opposed second guide bearings 660, while the spherical socket 654 is provided with a corresponding first guide tracks 662 and pair of second guide tracks 664. The first guide bearing 658 moves in the first guide track 662 to limit motion of the spherical element 652 with respect to the spherical socket 654 to motion that moves the first guide bearing 658 along the first guide track 662, which in this embodiment is oriented to direct the first guide bearing 658 along a linear (arcuate) path that allows rotation of the inner spherical element 652 and the outer spherical socket 654 about a vertical steering axis 666. In addition to pivotal motion about the steering axis 666, rotational motion about the axis of rotation of the first guide bearing 658 is allowed; in the mechanism 650, the first guide bearing is positioned on the inner spherical element 652 such that its axis of rotation is also a longitudinal axis 668 about which the shaft 656 tilts.

The second guide bearings 660 move in their respective second guide slots 664; however, the second guide slots 664 direct the second guide bearings along non-linear paths, such that the allowed motion between the inner spherical element 652 and the outer spherical socket 654 differs depending on the location of the second guide bearings 660 in the second guide slots 664. Each of the second guide slots 664 has a linear response segment 670, which allows motion about a pivot axis 672; to provide this response, each of the linear response segments 670 resides along an arc that forms a portion of a diameter of the outer spherical socket 654 which is intersected by a shaft axis 674 along which the shaft 656 extends. While the second guide bearings 660 move in the liner response segments 670 of the second guide tracks 664, the motion of the spherical element 652 with respect to the spherical socket 654 is limited to pivotal motion about the pivot axis 672, and thus tilting of the spherical element 652 about the longitudinal axis 668 causes rotation of the spherical socket 654 about a vertical steering axis 666. The linear response segment 670 of each second guide slot 664 joins at each end to a tilt-accommodating end segment 676, which is directed at an angle to the linear response segment 670. The end segments 676 are angled to direct the second guide bearings 660 in a direction that allows further free tilting of the inner spherical element 652 with respect to the spherical socket 654 without causing a further steering response about the steering axis 666. It should be appreciated by one skilled in the art that alternative arrangements of guide elements and guide tracks could be employed to provide a similar response, or to provide a different non-linear response. The particular configuration of the guide tracks depends on the steering response desired, and could be determined mathematically or experimentally; in the latter case, the desired path of the tracks could be modeled by mounting a router to an inner spherical element and cutting the guide tracks in the outer spherical socket while the shaft is moved through the desired response motions.

Figure 25:
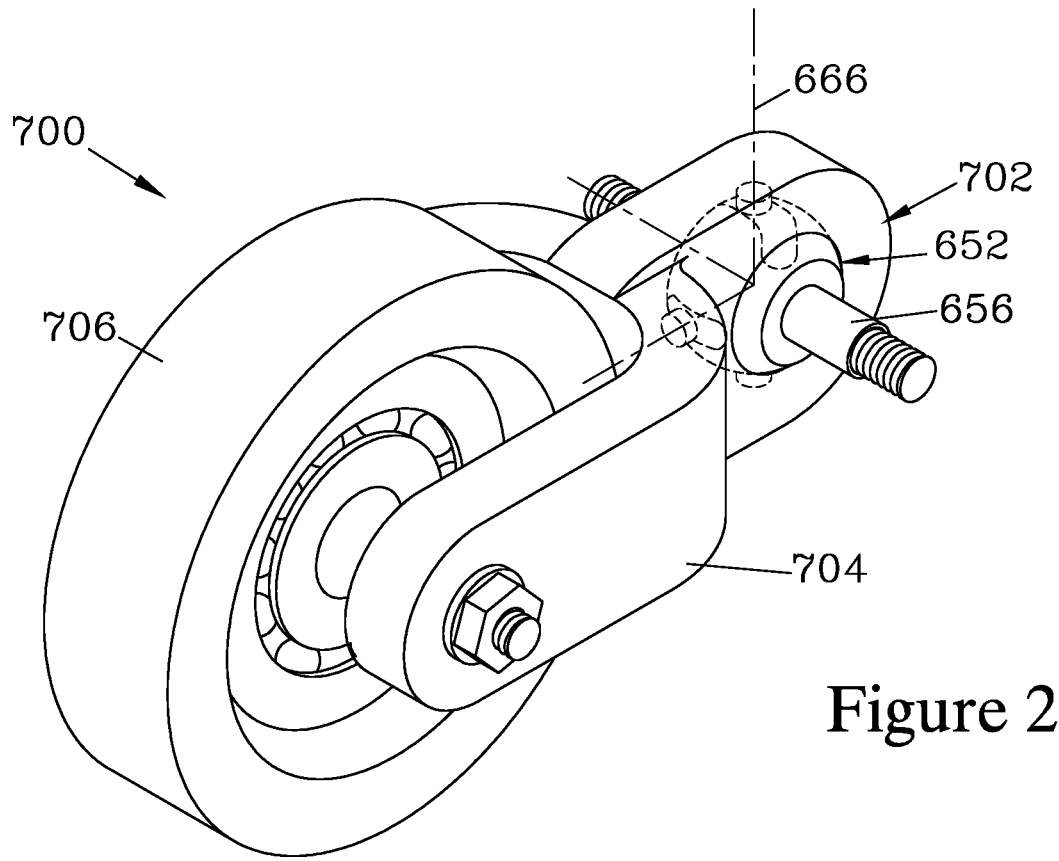

The steering mechanism 650 can be adapted for a variety of applications for lean-to-steer devices. For example, shaft 656 could be affixed to a body and the spherical socket 654 incorporated into the inner race of a roller bearing of a wheel, to provide a steerable wheel assembly such as those discussed above. However, it has been found that lean-to-steer devices employing steerable wheel assemblies where the lean-to-steer mechanism resides inside the hub of the wheel may be limited in the degree of tilt which they can accommodate, due to interference of the components. One approach to allowing a greater degree of tilt is to offset the wheel from the shaft. FIG. 25 illustrates a lean-to-steer assembly 700 that incorporates elements of the steering mechanism 650; in the assembly 700, a spherical socket 702 is extended to provide a fork member 704, to which a wheel 706 is rotatably mounted. The shaft 656 of this embodiment is affixed to a body (not shown) in a manner similar to that of the steerable wheel assemblies discussed above. In the assembly 700, tilting of the shaft 656 causes the fork member 704 and the wheel 706 mounted thereto to both pivot about the steering axis 666.

Figure 26:
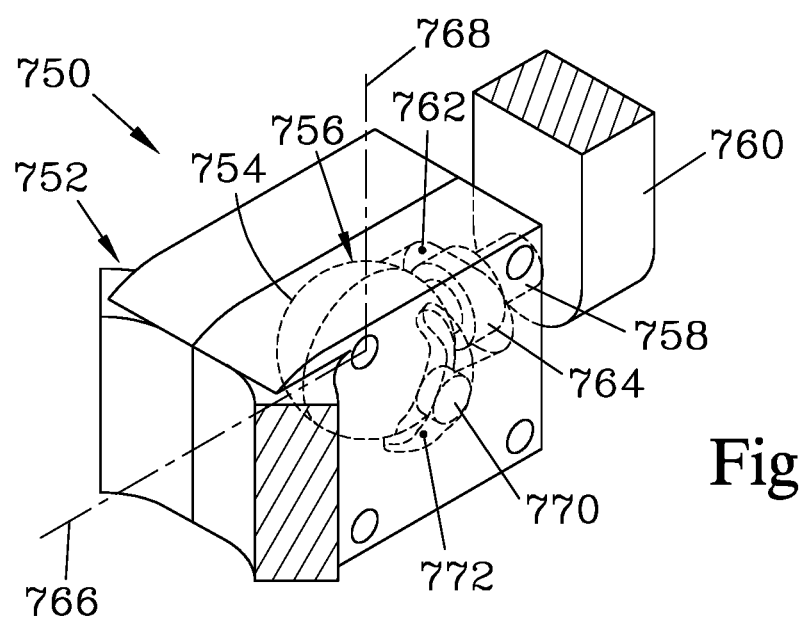
Figure 27:
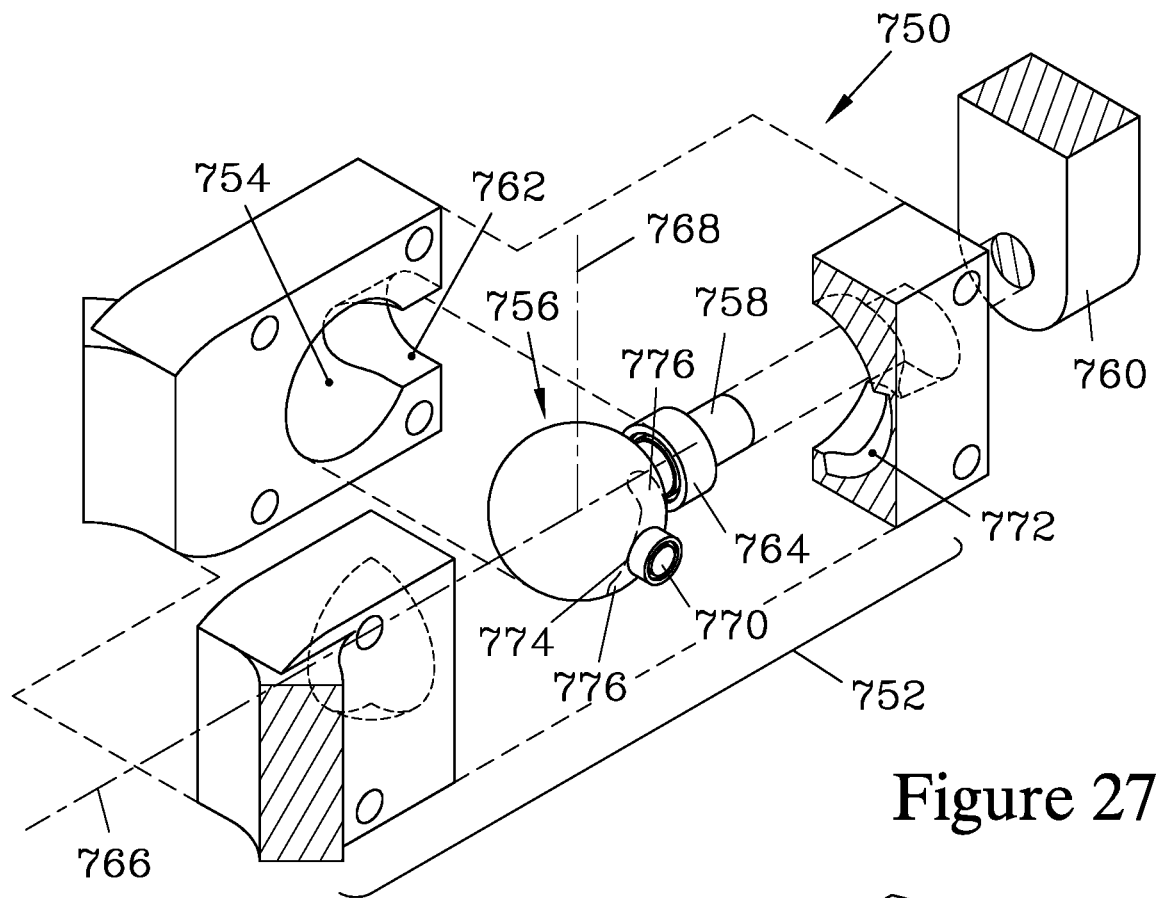

FIGS. 26 and 27 illustrate a lean-to-steer mechanism 750 with a simplified structure which offers greater flexibility in mounting to a body; FIG. 26 shows the mechanism assembled, and FIG. 27 shows it partially exploded. The mechanism 750 again employs a fork member 752 provided with a spherical socket 754, and an inner spherical element 756 that is affixed to a support shaft 758, which in turn is affixed to a body bracket 760. In the mechanism 750, the fork member 752 is provided with a guide passage 762 that is formed as a horizontal slot that is slidably engaged by a shaft bearing 764 mounted onto the support shaft 758; the shaft bearing serves as a first guide element, while the guide passage 762 serves as a first motion-limiting element. The engagement of guide passage 762 and the shaft bearing 764 limits the rotational motion between the spherical element 756 and the socket 754 to either tilting motion about a longitudinal axis 766 along which the support shaft 758 extends, limited pivoting motion about a vertical steering axis 768, or a combination of these motions.

The desired lean-to-steer action is achieved by coordinating the two pivoting motions by use of a guide bearing 770, mounted to the spherical element 756, and a guide track 772 provided in the spherical socket 754. The engagement of the guide bearing 770 with the guide track 772 limits the rotation of the spherical element 756 in the socket 754 to motion that moves the guide bearing 770 along the guide track 772; the guide bearing 770 serves as a second guide element, while the guide track 772 serves as a second motion-limiting element. When the operator tilts the body of the device employing the mechanism 750, the bracket 760 and support shaft 758 are tilted about the longitudinal axis 766. Because the motion of the spherical element 756 relative to the socket 754 is limited by the guide bearing 770 and guide track 772, the tilting motion can only be accommodated by movement of the guide bearing 770 along the guide track 772.

When the guide bearing 770 is in an inclined central active response segment 774 of the guide track 772 (shown in FIG. 27), movement of the guide bearing 770 along the guide track 772 requires rotation of the spherical element 756 relative to the socket 754 about the steering axis 768. The active response segment 774 could be directed along a circumference of the spherical socket 754 to provide a linear steering response, or could deviate from following a circumference to provide a slightly variable steering response when the guide bearing 770 traverses the active response segment 774. The guide passage 762 must be sized relative to the shaft bearing 764 to allow sufficient pivoting about the steering axis 768 to allow the guide bearing 770 to fully traverse the active response segment 774.

The guide track 772 also has two end segments 776 that bracket the active response segment 774 and which, in the mechanism 750 illustrated, are directed along vertically-directed arcs that allow tilting of the spherical element 756 about the longitudinal axis 766 without rotation about the steering axis 768 when the guide bearing 770 is in one of the end segments 776. The result of the illustrated configuration of the guide slot 772 is that leaning within a specified range, when the guide bearing 770 travels along the active response segment 774, results in a steering response of the fork 752 about the steering axis 768 where the degree of steering rotation increases with increased leaning. Once the leaning exceeds the specified range, when the guide bearing 770 enters one of the end segments 776, then further leaning does not result in further increase of the steering action. It should be appreciated that alternative response schemes could be achieved by employing a different guide slot configuration, or a similar response could be achieved by employing a guide groove in the inner spherical element that is engaged by a guide element protruding inward from the spherical socket.

Figure 28:
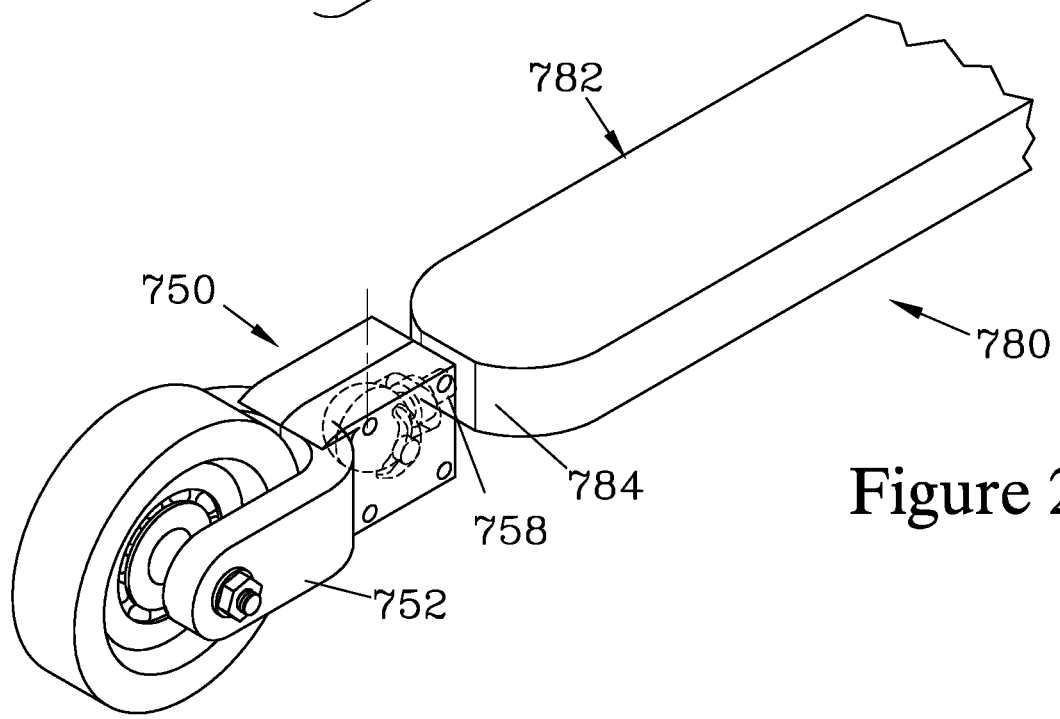

FIG. 28 illustrates a portion of one example of a lean-to-steer device 780 that employs one or more lean-to-steer mechanisms such as the mechanism 750. The device 780 is formed as a training ski, having an elongated body 782. The shaft 758 of the mechanism 750 is affixed to a front end 784 of the body 782.

Figure 29:
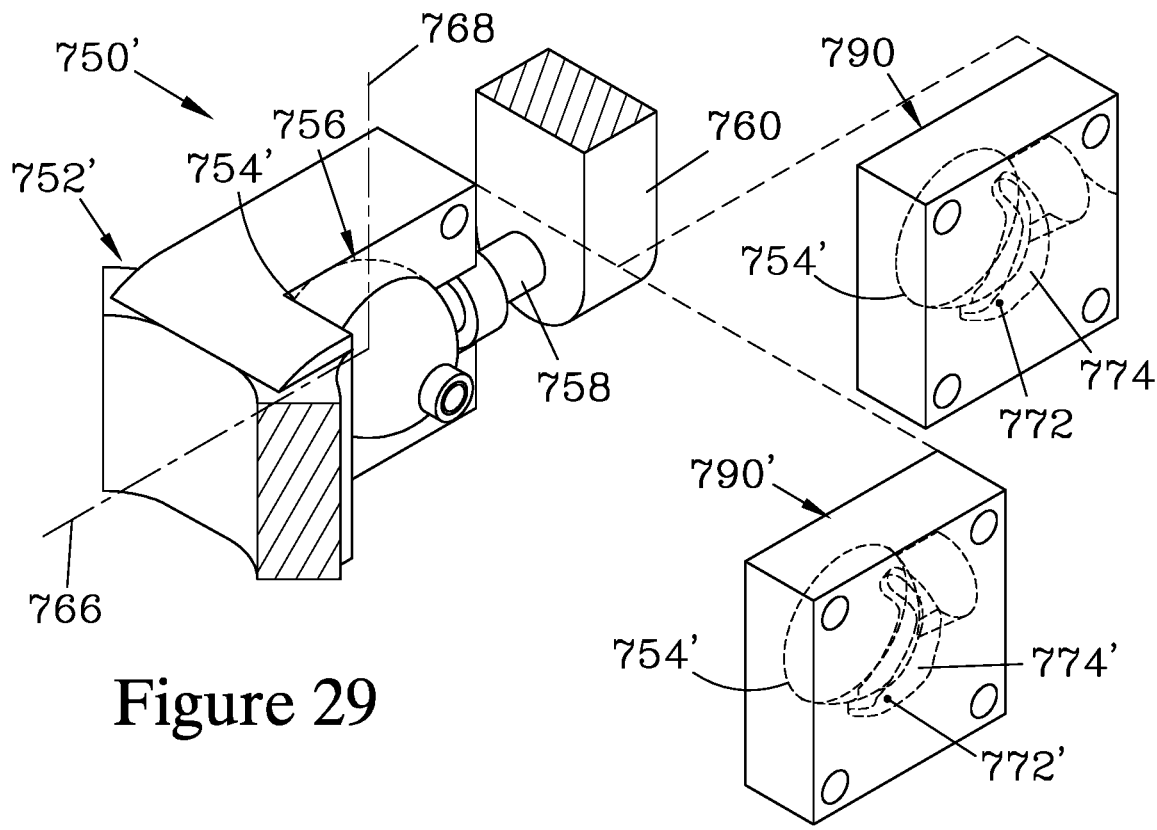

FIG. 29 illustrates a lean-to-steer mechanism 750' that allows alternative second guide slots (772, 772') to be employed to provide different steering responses. Each of the second guide slots (772, 772') is provided on an interchangeable guide block (790, 790') that attaches to the remainder of the fork member 752' and contains a portion of the spherical socket 754'. The guide slots (772, 772') each have an active response segment (774, 774'), where the inclination of the active response segment 774 relative to the longitudinal axis 766 differs from the inclination of the active response segment 774'. The difference in inclination results in a different steering response for the guide slots (772, 772') when the steering mechanism 750' is subjected to the same amount of leaning about the longitudinal axis 266.

Figure 30:
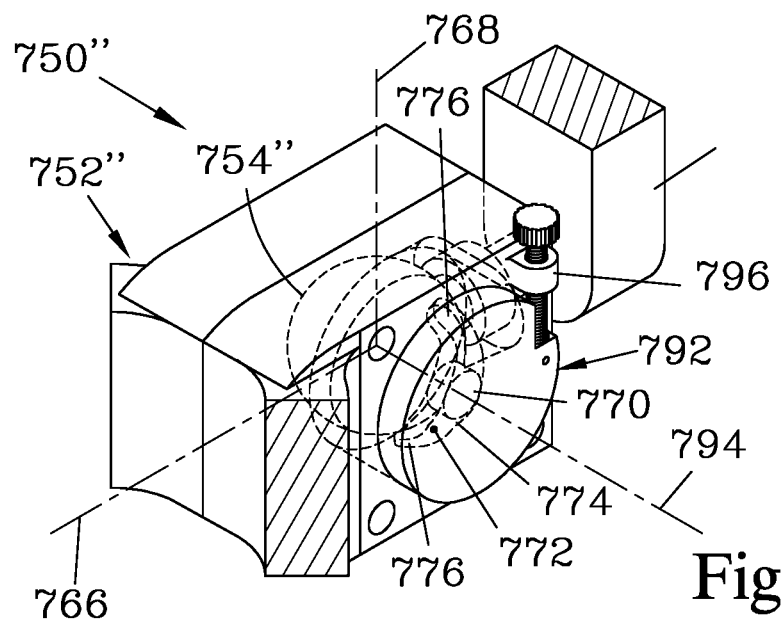

FIG. 30 illustrates a lean-to-steer mechanism 750" that provides an alternative scheme for adjusting the steering response. In the mechanism 750", the guide slot 772 is provided on a pivoting block 792 that is pivotably attached to the remainder of the fork member 752" so as to pivot about a horizontal transverse axis 794 that is perpendicular to the longitudinal axis 766 and to the steering axis 768. The pivoting block 792 also provides a portion of the spherical socket 754". The angular position of the pivoting block 792 is set by an adjustment mechanism 796, which can be adjusted to change the angle of the guide slot 772. In the mechanism 750", the angle of the active response segment 774 and the end segments 776 are both changed when the orientation of the pivot block 792 is adjusted, and thus some slight steering action may occur when the guide bearing 770 traverses one of the end segments 776, depending on the current orientation of the pivot block 792. It should be appreciated that a similar adjustment could be achieved with a fork member designed such that the angle of the entire spherical socket relative to the remainder of the fork member can be adjusted.

Figure 31:
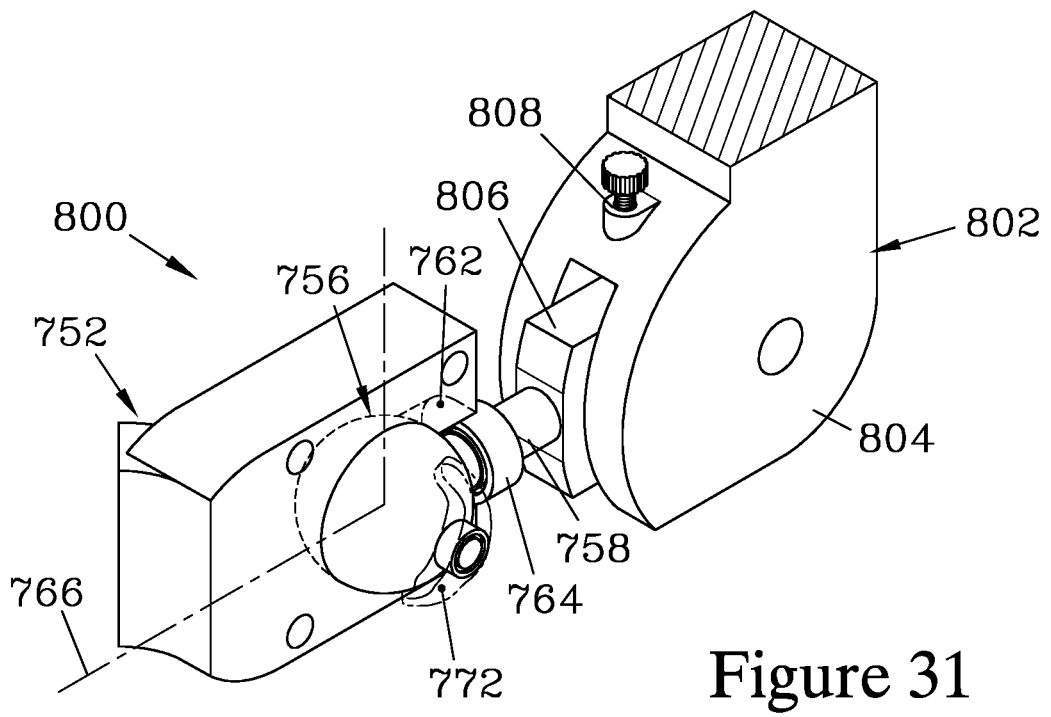

FIG. 31 illustrates a lean-to-steer mechanism 800 which employs the fork 752 (only partially shown) and related elements, but which employs an alternative body bracket 802 to provide adjustment of the steering response. The body bracket 802 has a bracket housing 804 in which a tilting block 806 is pivotably mounted. The angular position of the tilting block 806 relative to the bracket housing 804 is adjusted by an adjustment mechanism 808. The support shaft 758 is affixed to the tilting block 806 in the same manner as it is affixed to the body bracket 760 shown in FIG. 26, and thus adjusting the angle of the tilting block 806 serves to also adjust the angle of the shaft 758 and the spherical element 756 that is affixed thereto. Since the position of the fork 752 relative to the shaft 758 is constrained by the engagement of the guide passage 762 with the shaft bearing 764, tilting the shaft 758 also tilts the fork 752, including the guide slot 772 that is formed therein, thereby changing the angle of the guide slot 772 relative to the longitudinal axis 766. It should be appreciated that a similar effect might be achieved by forming the guide slot with the ability to be vertically adjusted with respect to the remainder of the fork, thereby changing the angle of the support shaft relative to the fork and the guide slot.

Slight adjustment of the steering response can also be provided by incorporating a degree of flexibility into the device to provide additional control of the motion by the operator. Such flexibility could be incorporated into the body of the device, or could be provided by mounting each lean-to steer mechanism to the body via a flexible member. Such flexibility provides a subtle steering action in response to shifting of the operator's weight towards the front or back along the body, as the flexing acts to slightly alter the inclination of the lean-to-steer mechanism in response to shifting of the user's weight forward and backward, which causes greater or lesser flexing in response to the longitudinal weight distribution on the body.

Figure 32:
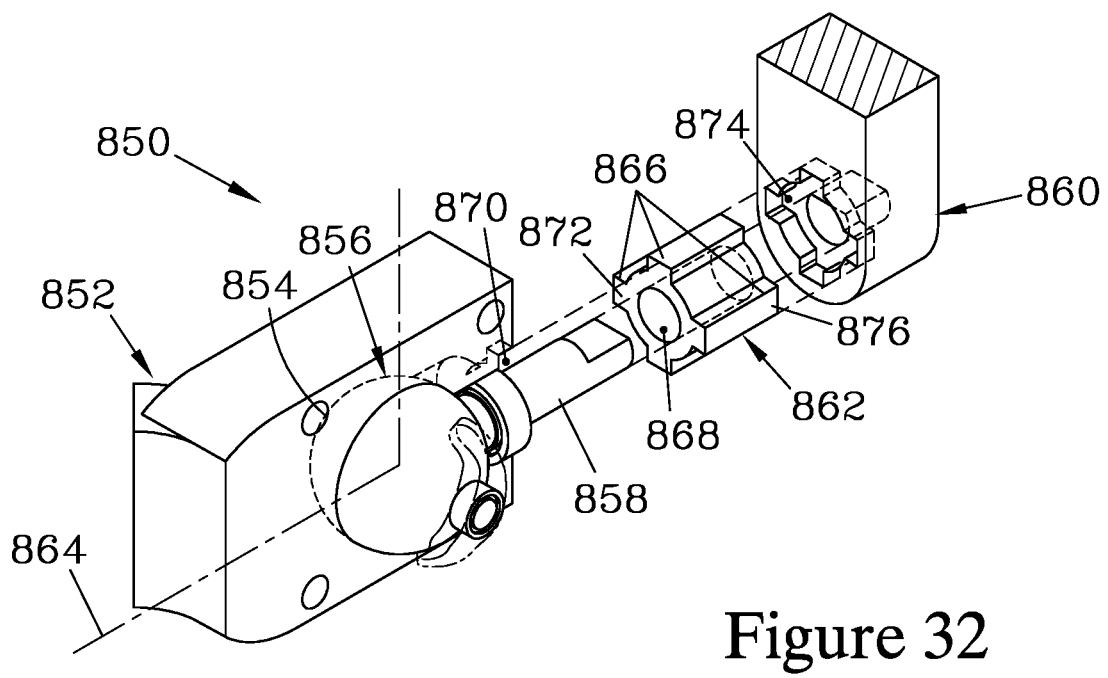

FIG. 32 illustrates a lean-to-steer mechanism 850 that has many features in common with the mechanism 750 shown in FIGS. 26 and 27 and discussed above. The mechanism 850 again employs a fork member 852 provided with a spherical socket 854, and an inner spherical element 856 that is affixed to a support shaft 858, which in turn is affixed to a body bracket 860. The interaction between the spherical element 856 and the spherical socket 854 is essentially the same as the interaction of the spherical element 756 in the spherical socket 754 discussed above.

In the mechanism 850, a resilient element 862 is interposed between the fork member 852 and the body bracket 860 to provide a resistance to leaning of the body bracket 860 about a longitudinal axis 864. The resilient element 862 has a shaped cross-section with four protrusions 866, and a central passage 868 through which the support shaft 858 passes. The fork member 852 is provided with a fork member shaped recess 870 that is configured to non-rotatably engage a first end 872 of the resilient element 862, and the body bracket 860 is provided with a similar bracket shaped recess 874 configured to non-rotatably engage a second end 876 of the resilient element 862. When the mechanism 850 is assembled, the ends (872, 876) of the resilient element 862 respectively engage the shaped recesses (870, 874), preventing rotation between each of the ends (872, 876) and the shaped recesses (870, 874) that it engages. When the user of a device employing the mechanism 850 shifts their weight to lean a body (not shown) affixed to the body bracket 860, such leaning can only be accommodated by twisting the second end 876 of the resilient element 862 relative to the first end 872, thereby generating a resilient reaction force that attempts to return the resilient element 862 to its untwisted rest state where the ends (872, 876) are aligned. The force of resistance to leaning could be adjusted by employing softer or stiffer resilient elements, which provide a different amount of resistant to twisting, or by including an adjustment mechanism to vary the compressive load on the resilient element.

FIGS. 33 & 34 illustrate a lean-to-steer mechanism 900 that again employs an inner spherical element 902 and outer spherical socket 904; rather than employing a fork member to mount a single wheel, the mechanism 900 has a pair of wheels 906 mounted onto a shaft 908 that extends from the inner spherical element 902, and is well suited for use as a skateboard truck. The outer spherical socket 904 is provided in a body bracket 910 that is positioned between the wheels 906. The inner spherical element 902 has a first guide bearing 912 mounted thereto, and a second guide bearing 914 is mounted to the shaft 908. The first guide bearing 912 engages a first guide slot 916 provided in the outer spherical socket 904, while the second guide bearing 914 engages a second guide slot 918 that is provided on a guide plate 920. The second guide slot 918 communicates with an access opening 922, allowing it to be installed without requiring the wheel 906 to be removed from the shaft 908. The guide plate 920 is provided with a pair of arcuate slots 924 that are engaged by plate bolts 926, allowing the guide plate 920 to be mounted to the body bracket 910 with a desired inclination of the second guide slot 918. The guide plate 920 can be replaced with a supplemental guide plate 928 having a supplemental plate guide slot 930 configured differently than the second guide slot 918 on the guide plate 920.

FIGS. 35 & 36 illustrate an lean-to-steer mechanism 950 having an alternative configuration suitable for use as a skateboard truck. Again, the mechanism 950 has an inner spherical element 952 and an outer spherical socket 954, with a wheel shaft 956 extending from the inner spherical element 952, and a pair of wheels 958 are mounted to the wheel shaft 956. The outer spherical socket 954 in the mechanism 950 is mounted to a body bracket 960 via a support shaft 962, and a first guide bearing 964 (shown in FIG. 35) is mounted on the support shaft 962. A first guide slot 966 (also shown in FIG. 35) is provided in the outer spherical socket 954. A second guide bearing 968 is mounted on the wheel shaft 956, and a second guide slot 970 is provided in a guide plate 972 that can be attached to the outer spherical socket 954. The guide plate 972 has a number of positioning holes 974 that allow it to be affixed to the outer spherical socket 954 in a number of different inclinations to adjust the steering response. The response is also affected by a resilient centering bushing 976 that is placed on the support shaft 962, interposed between the outer spherical socket 954 and the body bracket 960. Pivoting of the outer spherical socket 954 about a steering axis 978 acts to compress the centering bushing 976, creating a reaction force that biases the outer spherical socket 954 back to a central position. It should be noted that positioning the resilient bushing to respond to the steering action, rather than responding to the tilting action (as is the case with the bushings 104 shown in FIG. 7 and the bushings 210 shown in FIG. 14), allows a greater range of motion, as the tilting motion is frequently of greater angular magnitude than the steering motion.

Figure 37:
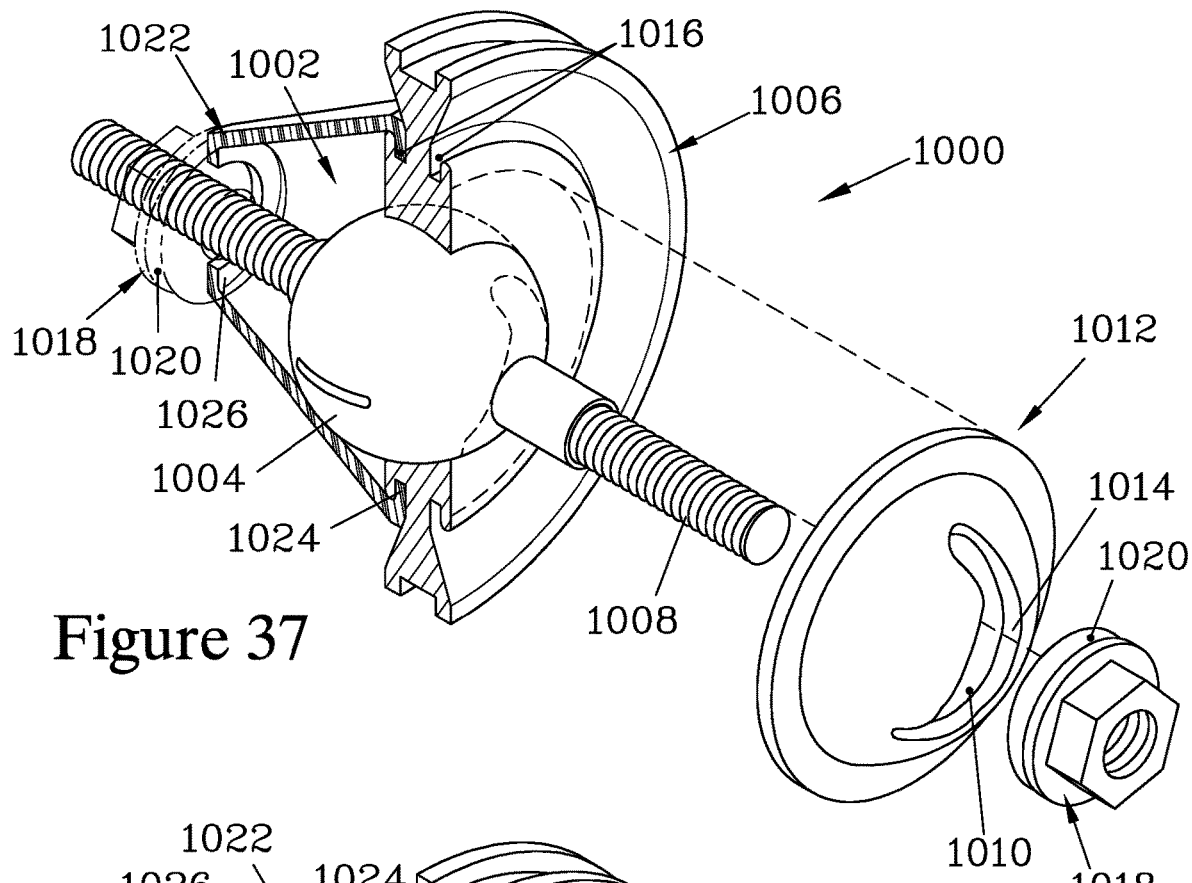
Figure 38:
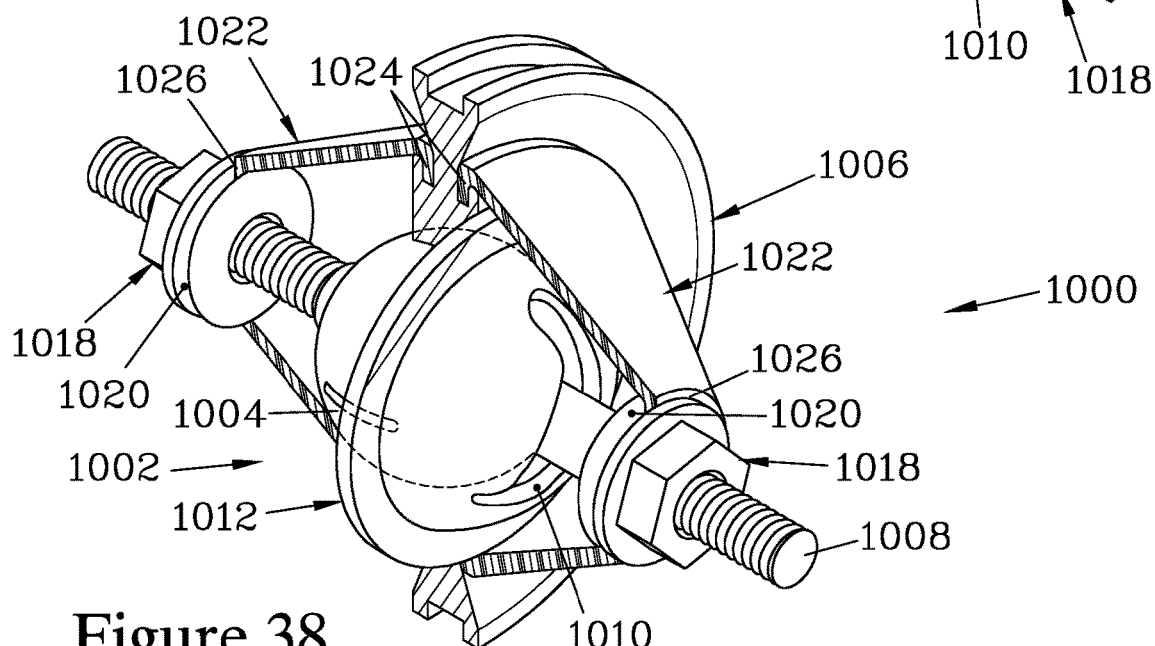

A greater range of motion while providing a resilient centering force can also be provided by employing a resilient tensioning element, rather than a compression bushing. FIGS. 37 & 38 are partially sectioned view that illustrate a steerable wheel assembly 1000 that is functionally similar to the assembly 500 shown in FIG. 22, having a lean-to-steer mechanism 1002 that controls the motion between an inner spherical element 1004 and an outer spherical socket 1006, where the outer spherical socket 1006 serves as the inner race of a roller bearing. A shaft 1008 extending from the inner spherical element 1004 engages a guide slot 1010 that guides the shaft along a non-linear path to provide a desired steering response. The guide slot 1010 is formed on a hemispherical slot member 1012, and has a central linear response segment 1014 that extends along an arc on a diameter of the inner spherical element 1004; the arcuate linear response segment 1014 guides the shaft 1008 along a path that provides a linear steering response, and thus provides a functionally linear path.

The outer spherical socket 1006 is formed with a pair of inner mounting grooves 1016, and a pair of tension adjustment elements 1018 (one of which is shown in phantom in FIG. 37) having outer mounting grooves 1020 are provided. A pair of resilient tension members 1022 (only one of which is shown in FIG. 37) are provided, each having a tension member inner lip 1024 and a tension member outer lip 1026. When installed on the assembly 1000, the tension member inner lip 1024 seats into one of the inner mounting grooves 1016 on the outer spherical socket 1006, while the tension member outer lip 1026 seats into the outer mounting groove 1020 on the tension adjustment element 1018 on the same side. The tension adjustment elements 1020 threadably engage the shaft 1008, allowing their position along the shaft 1008 to be adjusted relative to the outer spherical socket 1006, thereby adjusting the tensile forces on the tension member 1022. When the shaft 1008 is tilted by the operator leaning a body attached to the shaft 1008, the tension members 1022 must stretch to accommodate the tilting, generating a reaction force that biases the shaft 1008 back to a level position. It should be appreciated that the tension members 1022 can accommodate a significantly greater range of tilting motion compared to compression bushings, such as the bushings 104 shown in FIG. 7 or the bushings 210 shown in FIG. 14. When formed to enclose the elements (1004, 1006, 1012) of the lean-to-steer mechanism 1002, the tension members 1022 provide an additional benefit in keeping these elements (1004, 1006, 1012) free of debris.

While the lean-to-steer mechanisms discussed above for providing a non-linear response employ a ball-and-socket connection in combination with guide members and corresponding guide slots to control the response action, alternative structures for providing the same non-linear response can be employed. Examples of such mechanisms are shown in FIGS. 39-44.

Figure 39:
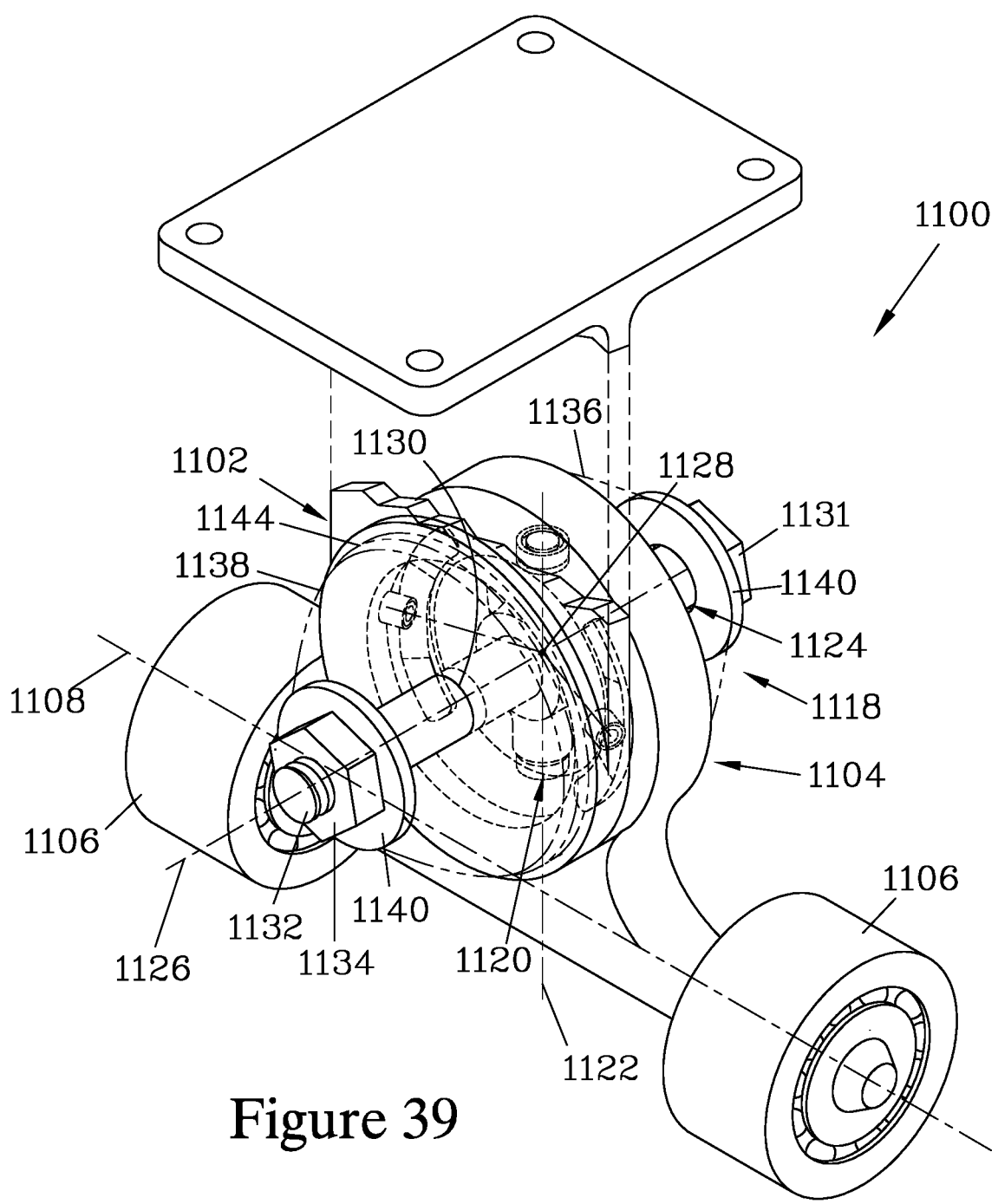
Figure 40:
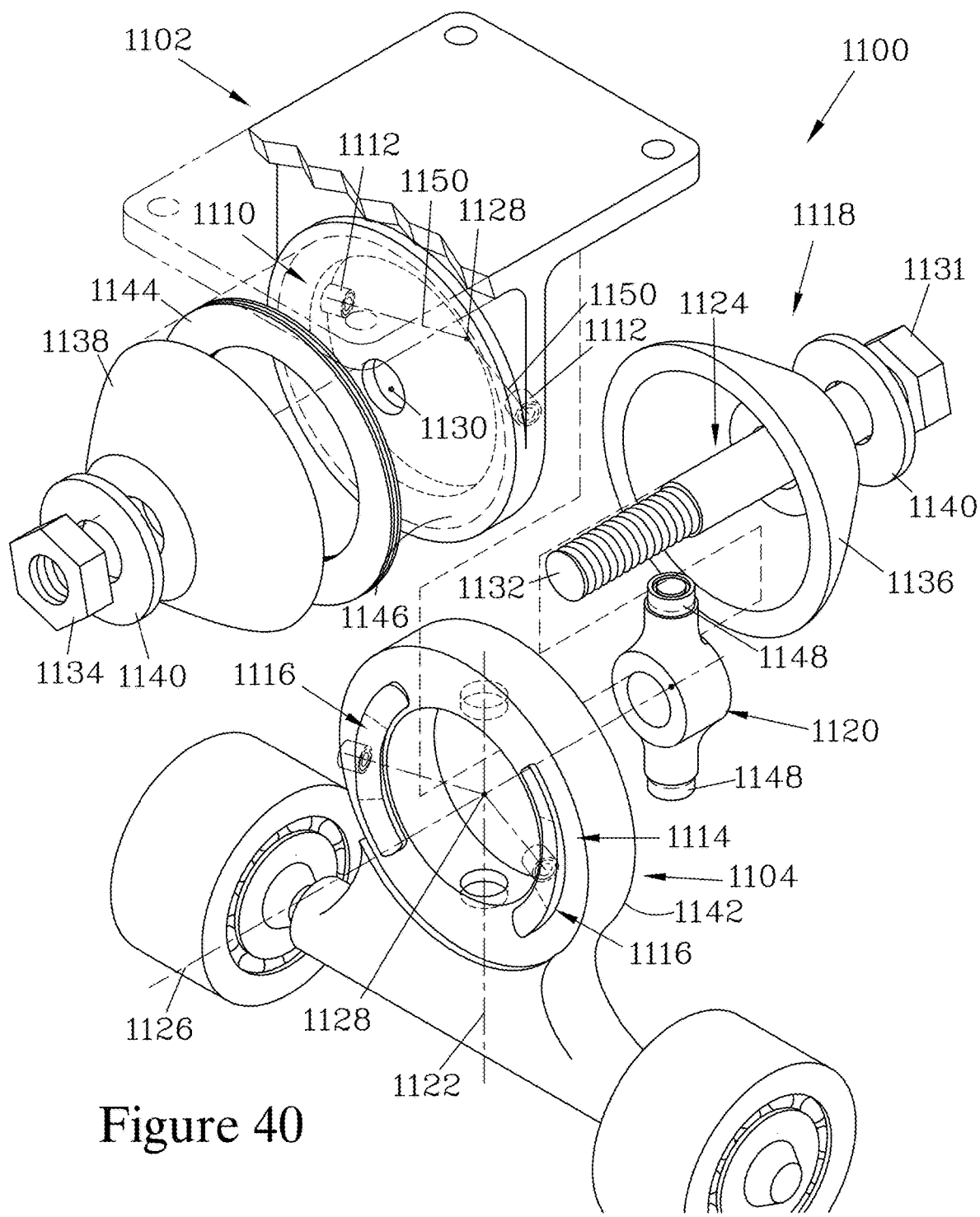
Figure 41:
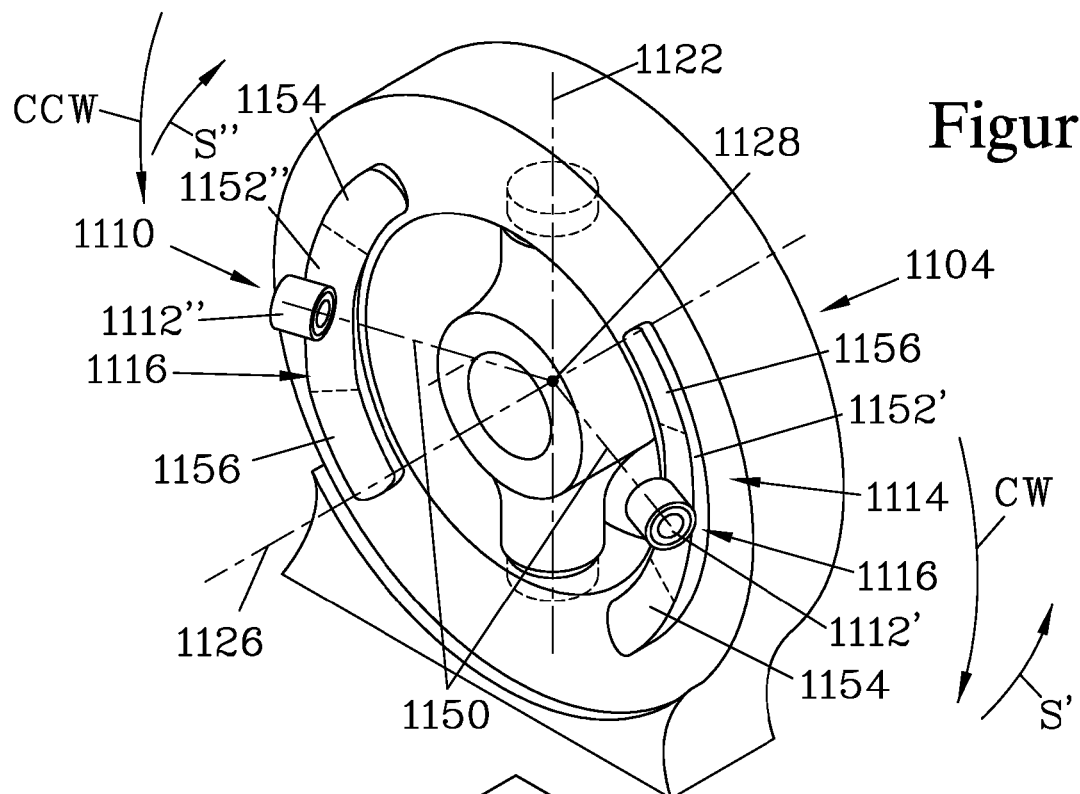

FIGS. 39-41 illustrate a lean-to-steer mechanism 1100 suitable for use in a skateboard or similar lean-to-steer device. FIG. 39 illustrates the mechanism 1100 when assembled, while FIG. 40 shows the components exploded, and FIG. 41 is a detail view showing the components that define the non-linear response. The mechanism 1100 has a first moving element 1102 that can be mounted a body (not shown) and a second moving element 1104 to which a pair of wheels 1106 are mounted, so as to rotate about a horizontal wheel axis 1108.

To provide the non-linear steering response, the first moving element 1102 is provided with a first tracking structure 1110 (labeled in FIGS. 40 and 41), which has a pair of guide bearings 1112 that serve as first structure tracking elements. The second moving element 1104 has a corresponding second tracking structure 1114 having a pair of guide ramps 1116 that serve as second structure tracking elements. The interaction of the guide bearings 1112 and the guide ramps 1116 to limit the motion of the second moving element 1104 in response to tilting of the first moving element 1102 is discussed in greater detail below with regard to FIG. 41.

To maintain the first tracking structure 1110 engaged with the second tracking structure 1114 and limit motion therebetween, a connecting structure 1118 is provided that limits the relative motion between the first moving element 1102 and the second moving element 1104 and also applies a compressive force to maintain engagement between the tracking structures (1110, 1114). The connecting structure 1118 of this embodiment employs a trunnion member 1120 that is rotatably mounted in the second moving element 1104 so as to rotate about a vertical steering axis 1122, and a shaft 1124 that passes through the trunnion member 1120 and extends substantially along a longitudinal axis 1126 about which the first moving element 1102 tilts. The longitudinal axis 1126 intersects the steering axis 1122 at a central point 1128. The trunnion member 1120 serves as a shaft retaining element that connects the shaft 1124 to the second moving element 1104, while the first moving element 1102 is provided with a shaft passage 1130 sized to slidably engage the shaft 1124 so as to limit the motion of the first moving element 1102 to pivoting on the shaft 1124 about the longitudinal axis 1126 or to sliding along the shaft 1124. Since the shaft 1124 is in turn connected to the second moving element 1104 via the trunnion member 1120, the relative rotational motions between the first moving element 1102 and the second moving element 1104 are limited to rotation about the steering axis 1122, rotation about the longitudinal axis 1126, or a combination of these motions.

The shaft 1124 has a shaft head 1131 and a shaft threaded end 1132, which can be engaged by a nut 1134 that serves as a clamping element. In use, the shaft 1124 passes through the trunnion member 1120 as well as through a pair of resilient bushings 1136, 1138 (shown in phantom in FIG. 39) that serve as resilient retaining elements. Washers 1140 are interposed between the shaft head 1131 and the resilient bushing 1136, and between the nut 1134 and the resilient bushing 1138. The resilient bushing 1136 in turn engages a second moving element bearing surface 1142 on the second moving element 1104, while the resilient bushing 1138 engages a thrust bearing 1144 that in turn engages a first moving element bearing surface 1146 on the first moving element 1102. When the nut 1134 is tightened on the shaft threaded end 1132, the resilient bushings 1136, 1138 become compressed between the nut 1134 and the shaft head 1131, and apply a compressive load to the second moving element 1104 and the first moving element 1102 to force them towards each other, thereby maintaining the guide bearings 1112 on the first moving element 1102 forcibly engaged against the guide ramps 1116 on the second moving element 1104. It should be noted that the engagement of the resilient bushing 1136 against the second element bearing surface 1146 provides resistance to pivoting of the trunnion member 1120 and the shaft 1124 relative to the second moving element 1104, and thus provides a centering bias for the lean-to-steer mechanism 1100.

The trunnion member 1120 engages the second moving element 1104 via a pair of trunnion bearings 1148 that allow pivoting of the second moving element 1104 about the steering axis 1122 relative to the shaft 1124, while the thrust bearing 1144 and the slidable engagement of the shaft passage 1130 with the shaft 1124 allows tilting of the first moving element 1102 about the longitudinal axis 1126 relative to the shaft 1124. Since the shaft 1124 is connected intermediate between the first moving element 1102 and the second moving element 1104, the first moving element 1102 is movable relative to the second moving element 1104 about the longitudinal axis 1126 (allowing the first moving element 1102 and the body affixed thereto to tilt) and about the steering axis 1122 (allowing the steering action of the second moving element 1104 relative to the body attached to the first movable element 1102).

As better shown in FIG. 41, the steering response of the second moving element 1104 to tilting of the first moving element 1102 is controlled by the engagement of the guide bearings 1112 on the guide ramps 1116, in a similar manner to the motion-limiting action of the guide bearings and guide slots shown in FIGS. 24-36 and discussed above. The guide bearings 1112 are mounted to the first moving element 1102 (omitted for clarity in FIG. 41) and the guide ramps 1116 are configured such that, when the guide bearings 1112 are forcibly engaged against the guide ramps 1116 by compressive forces (as discussed above), each of the guide bearings 1112 rotates about an individual guide bearing axis 1150 that intersects the central point 1128 regardless of the rotational position of the first moving element 1102 relative to the second moving element 1104.

Various profiles for the guide ramps 1116 could be employed; as illustrated, each of the guide ramps 1116 has a central linear response segment 1152 bracketed by two end segments 1154, 1156. When the guide bearings 1112 are initially rolled across the guide ramps 1116 by tilting of the first moving element 1102 away from an upright neutral position, each of the linear response segments 1152 directs the associated guide bearing 1112 along an inclined path. Tilting the body and the first moving element 1102 in a clockwise direction, as indicated by the arrow CW, causes the guide bearing 1112' to force the linear response segment 1152' backwards as it rotates downwards, while the corresponding upwards movement of the guide bearing 1112" allows the linear response segment 1152" to move forwards to compensate, resulting in a pivot of the second moving element 1104 about the steering axis 1122, as indicated by the arrow S'. However, when the guide bearings 1112 reach the end segments 1154, further movement along the guide ramps 1116 does not result in any steering response. Similarly, tilting of the body and first moving element 1102 in a counter-clockwise direction, as indicated by the arrow CCW, causes the guide bearing 1112" to force the linear response segment 1152" backwards, and the guide bearing 1112' allows the linear response segment 1152' to move forwards, resulting in a steering response in the other direction as indicated by the arrow S". Again, once the tilting is sufficient to bring the guide bearings 1112 to the end segments 1156, the guide ramps 1116 are configured to allow further tilting without a steering response.

Figure 42:
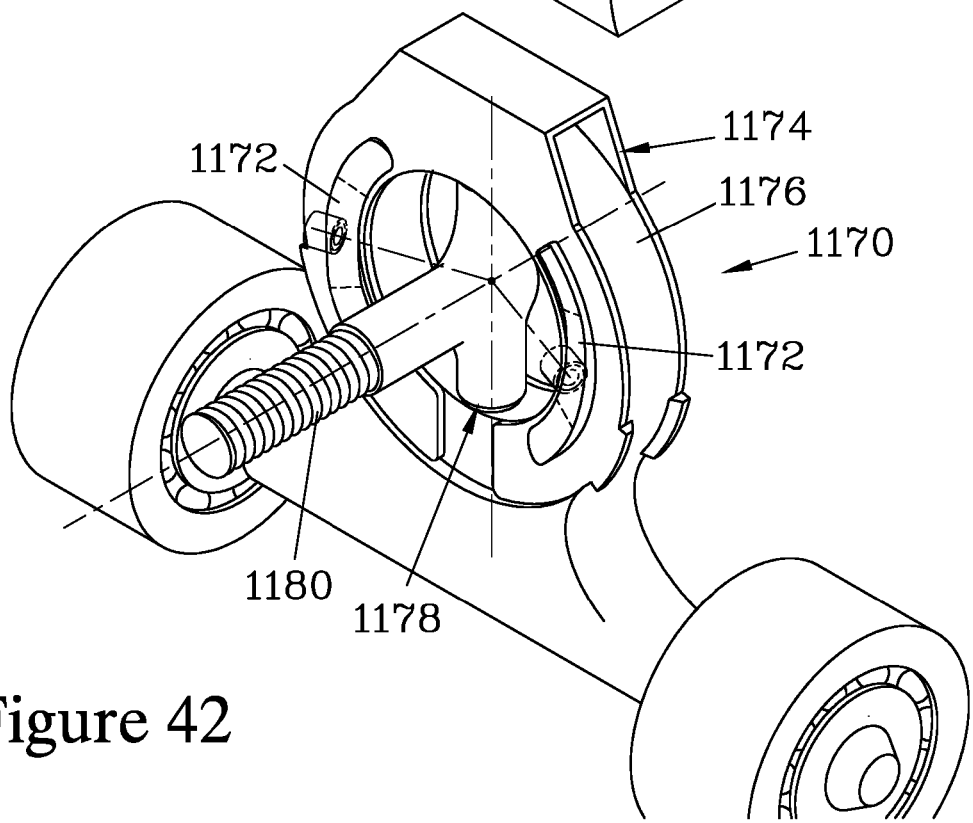

Since the steering response is controlled by the guide ramps, providing guide ramps having a different configuration allows one to change the steering response to provide a desired action. FIG. 42 illustrates a second moving element 1170 that is designed to allow a user to readily replace a pair of guide ramps 1172 with an alternative configuration, and can be substituted for the second moving element 1104 discussed above. The guide ramps 1172 are provided on a guide clip 1174 that snaps onto a second moving element base portion 1176, and can be readily removed and replaced by a similar guide clip having a different guide ramp configuration. Because the forces on the guide ramps 1172 are primarily compressive forces normal to the second moving element base portion 1176, it may be practical to make the guide clip 1174 from a plastic material for greater ease of fabrication.

FIG. 42 also illustrates an alternative trunnion member 1178, which is formed integrally with a shaft 1180, thereby simplifying construction and reducing the overall size of the resulting lean-to-steer mechanism. However, this mechanism lacks the centering bias provided by the resilient bushing 1136.

Figure 43:
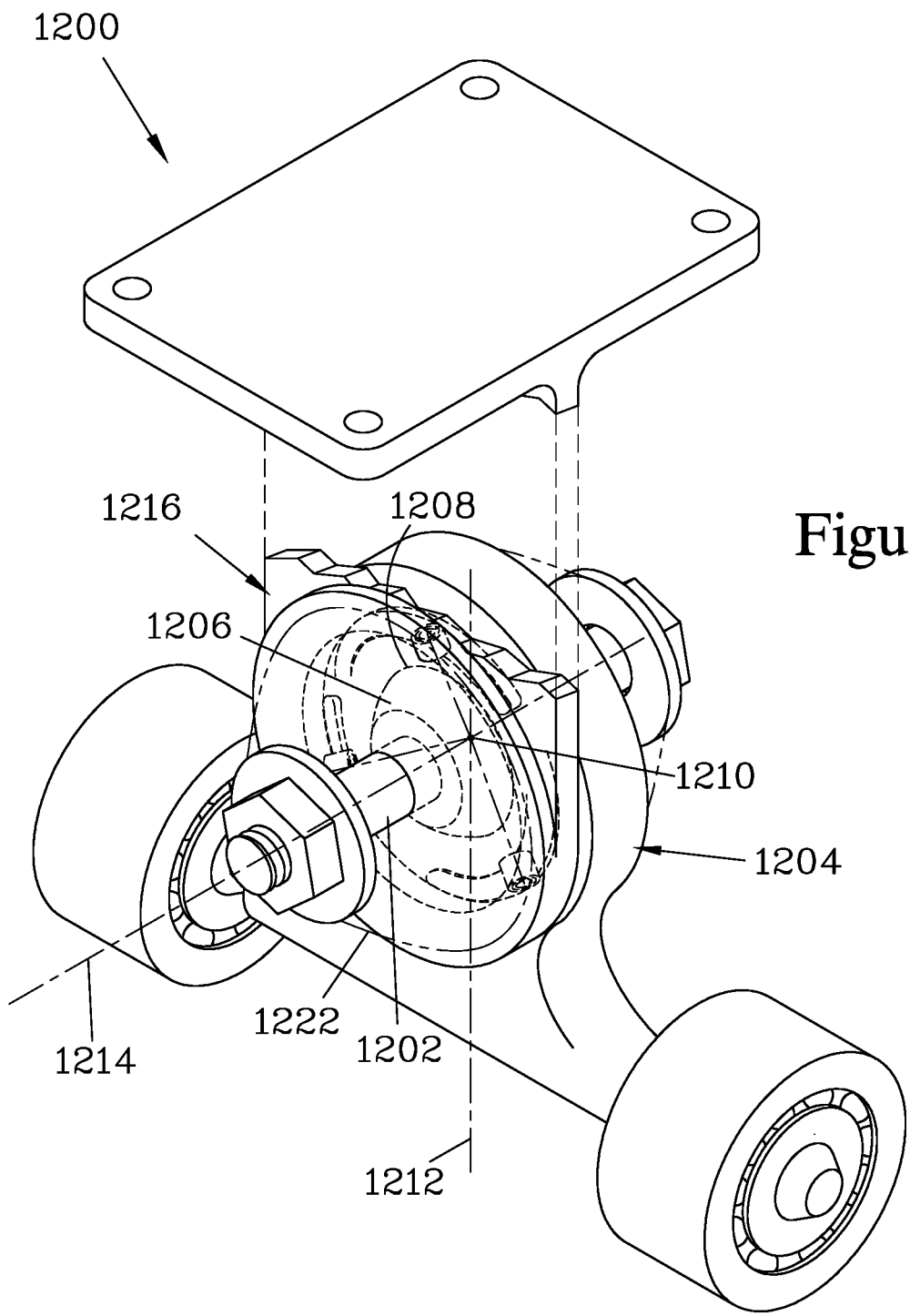
Figure 44:
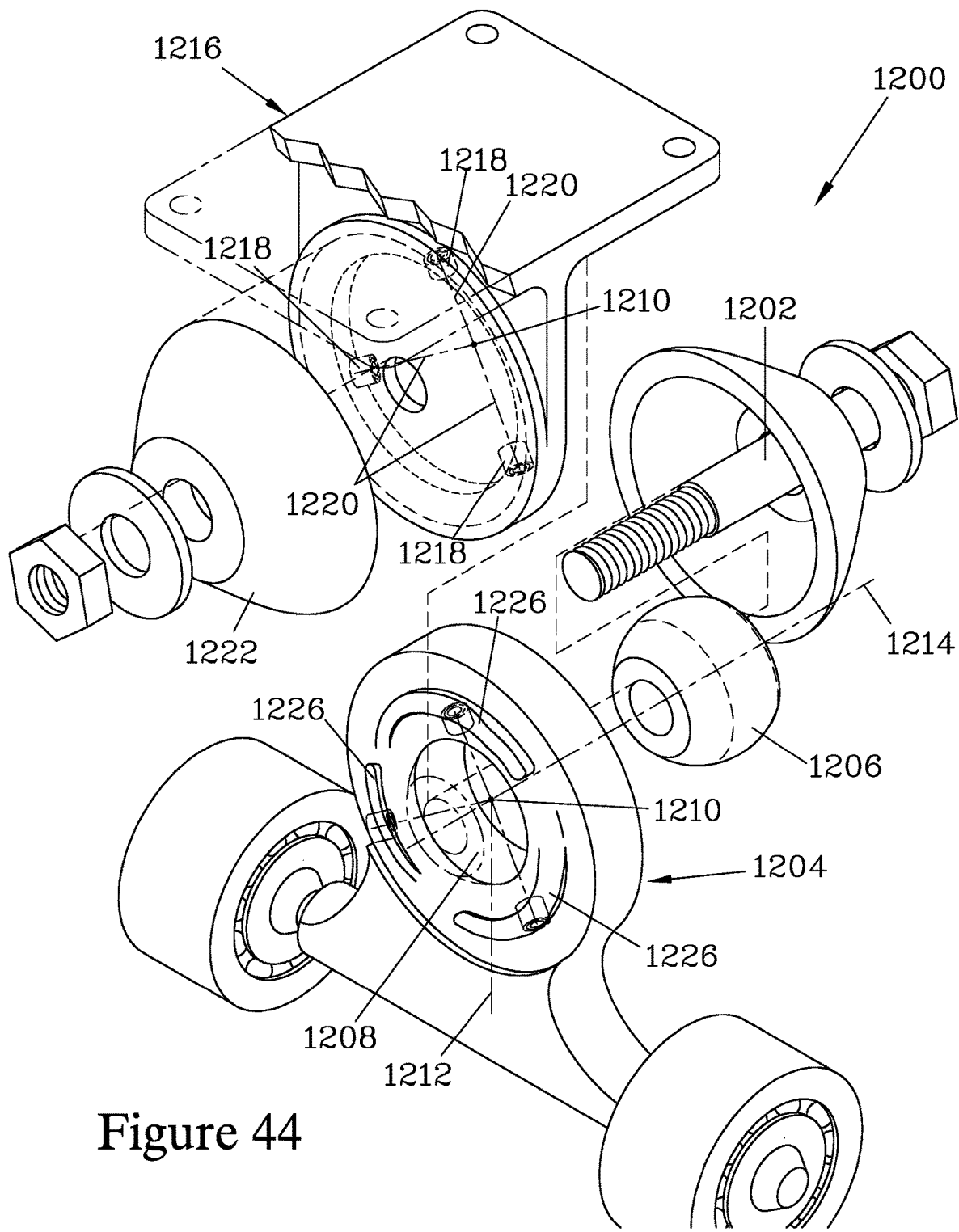

FIGS. 43 and 44 illustrate an alternative lean-to-steer mechanism 1200 that employs a ball-and-socket connection to mount a shaft 1202 to a second moving element 1204, rather than employing a trunnion member. The shaft 1202 passes through an inner spherical element 1206, which in turn is mounted in a spherical socket 1208 provided in the second moving element 1204 so as to pivot about a central point 1210, and thus provides for pivotal motion about a vertical steering axis 1212 and a longitudinal axis 1214, both of which intersect the central point 1210.

A first moving element 1216 is provided, and in this embodiment has three guide bearings 1218, each mounted to rotate about an individual guide bearing axis 1220 that intersects the central point 1210. The use of three guide bearings 1218, arranged at 120° from each other, avoids creating an effective horizontal axis of tilting that might result from using a pair of opposed guide bearings such as shown in FIGS. 39-41, since the motion of the inner spherical element 1206 in the spherical socket 1208 does not provide the resistance to such motion that is provided by the trunnion member 1120 shown in FIGS. 39-41. Because the shaft 1202 is rotatable with respect to the second moving element 1204 about the longitudinal axis 1214, a resilient bushing 1222 can directly engage a first moving element bearing surface 1224 to apply a compressive load, and no thrust bearing is needed.

The second moving element 1204 is provided with three guide ramps 1226, each positioned and configured to engage one of the guide bearings 1218 and to direct the guide bearing 1218 along a non-linear path in response to tilting of the first moving element 1216 to which the guide bearings 1218 are mounted. The exact configuration of the guide ramps 1226 can be determined experimentally or though CAD modeling to obtain the desired response, and there may be more than one configuration that can be employed to provide a particular desired response.

Figure 45:
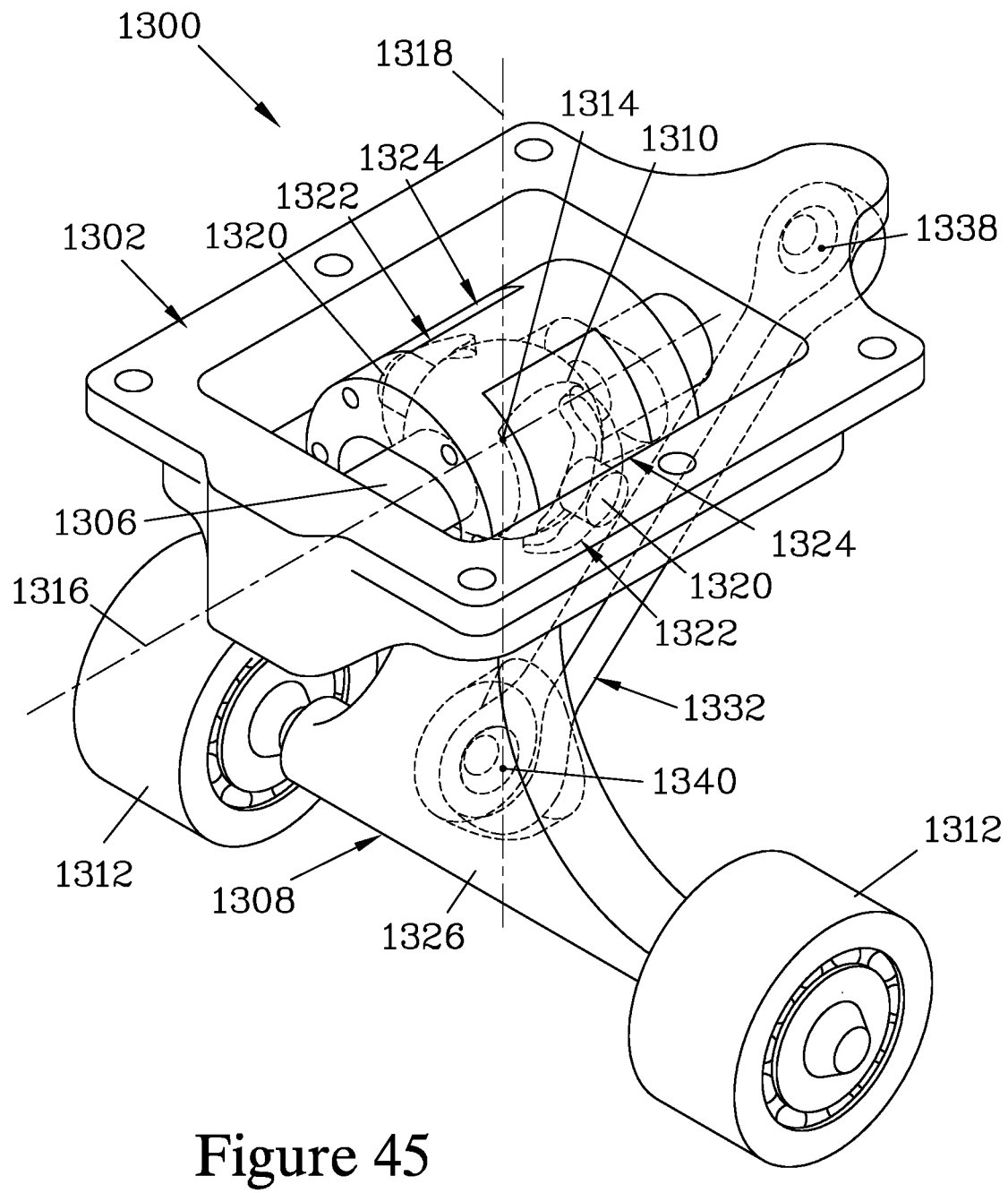
Figure 46:
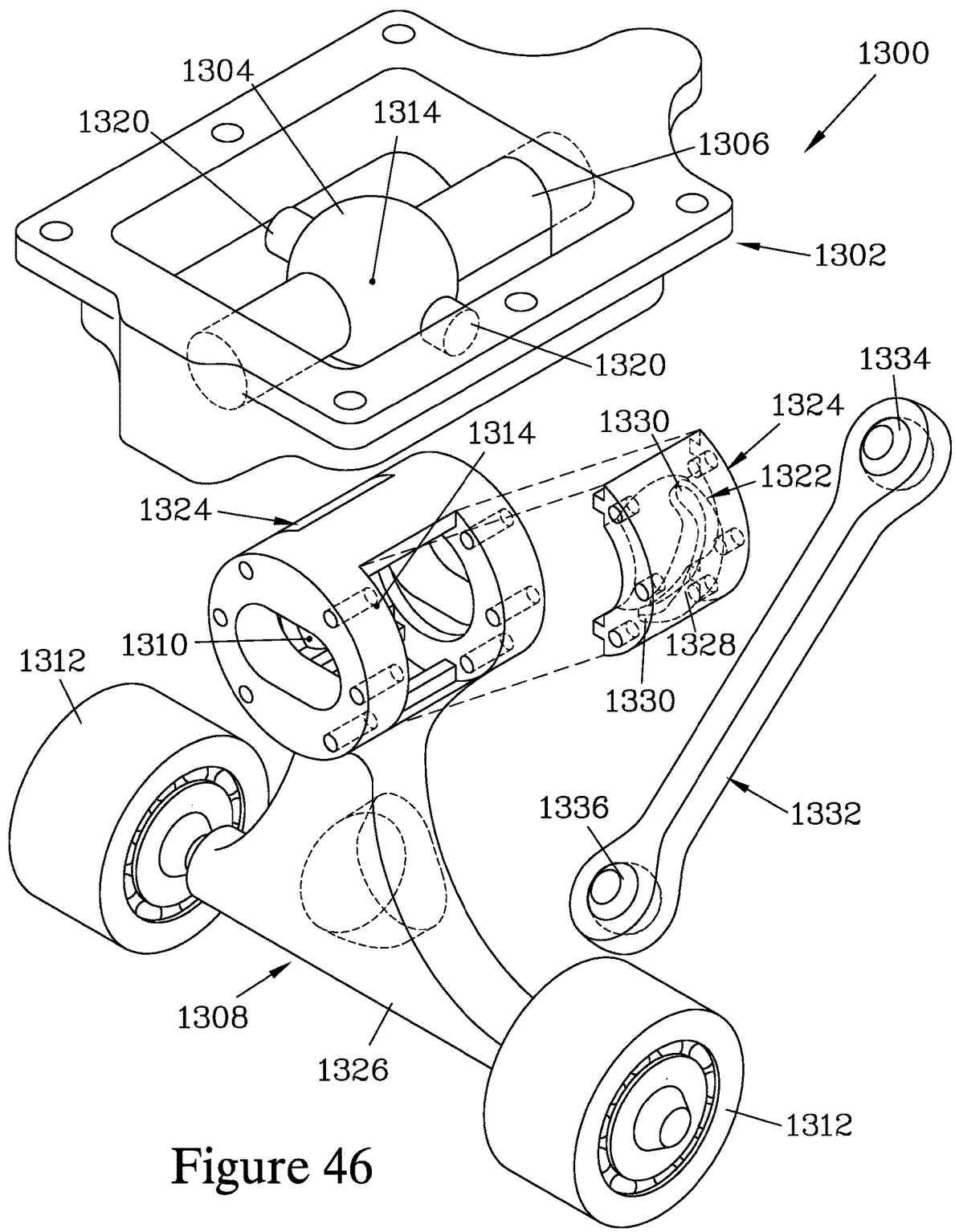

Variations of the lean-to-steer mechanism can be made to suit particular applications. For example, FIGS. 45 and 46 illustrate a lean-to-steer mechanism 1300 that is functionally similar to the mechanism 750 shown in FIGS. 26-28, but which is designed to provide more balanced forces for greater strength.

The lean-to-steer mechanism 1300 has a first moving element 1302, to which an inner spherical element 1304 (best shown in FIG. 46) is affixed via a support shaft 1306. The mechanism 1300 illustrated is particularly well suited for use in a skateboard or similar device.

In the mechanism 1300, the shaft 1306 extends on either side of the inner spherical element 1304 and is engaged by the first moving element 1302 at both ends of the shaft 1306, providing balanced support and reducing bending moments on the shaft 1306 that would result from support at only one end, as in the mechanism 750 discussed above. The first moving element 1302 is formed as a bracket that can be readily affixed to a body (not shown).

The mechanism 1300 also has a second moving element 1308 that is provided with a spherical socket 1310. A pair of wheels 1312 are mounted to the second moving element 1308. The spherical socket 1310 engages the inner spherical element 1304 so as to limit motion between the first moving element 1302 and the second moving element 1308 to rotation about a central point 1314, which resides at the intersection between a horizontal longitudinal axis 1316 and a vertical steering axis 1318 (shown in FIG. 45).

The motion between the moving elements (1302, 1308) is further limited by engagement between a first tracking structure, provided by a pair of guide bearings 1320 mounted to the first moving element 1302, and a second tracking structure provided by a pair of guide slots 1322 formed in the second moving element 1308, and in which the guide bearings 1320 can move. The guide bearings 1320 are mounted to the inner spherical element 1304 and extend on either side thereof to provide balanced forces. The guide bearings 1320 serve as first structure tracking elements. The guide slots 1322 are provided in a pair of guide inserts 1324 that are fastened to a second element body 1326 of the second moving element 1308. The guide slots 1322 serve as second structure tracking elements.

The engagement of the guide bearings 1320 with the guide slots 1322 limits the rotation of the spherical element 1304 in the socket 1310 to motion that moves the guide bearings 1320 along the guide slots 1322. When the mechanism 1300 is tilted by action of the user, the first moving element 1302, inner spherical element 1304, and support shaft 1306 are tilted about the longitudinal axis 1316. Because the motion of the spherical element 1304 relative to the socket 1310 is limited by the guide bearings 1320 and guide slots 1322, the tilting motion can only be accommodated by movement of the guide bearings 1320 along the guide slots 1322.

Each of the guide slots 1322 has a linear response segment 1328 bracketed by end segments 1330 (labeled in FIG. 46). The linear response segment 1328 is inclined such that movement of the guide bearing 1320 along the linear response segment 1328, responsive to tilting about the longitudinal axis 1316, can only be accommodated by pivoting of spherical socket 1310 about the steering axis 1318. As the tilt of the inner spherical element 1304 increases, the pivot of the spherical socket 1310 increases in proportion, until such time as the guide bearing 1320 reaches one of the end segments 1330. The end segments 1330 are configured to allow the guide bearing 1320 to move therein to accommodate further tilting without any steering response.

It should be appreciated that alternative lean-to-steer responses could be provided by employing a different configurations of the guide slots 1322. If the guide slots 1322 are provided on interchangeable guide inserts 1324 as shown, the guide inserts 1326 can be removably fastened to the second element body 1326 to allow them to be readily replaced by guide inserts having a different configuration to provide a different response. Matching pairs of guide inserts can be color coded or otherwise visually matched to allow the user to readily select a pair of guide inserts that have corresponding guide slots.

The mechanism 1300 is provided with a tie rod 1332 that serves as a diagonal brace to provide further strength. The tie rod 1332 has a spherical plain bearing 1334, 1336 mounted in each end (labeled in FIG. 46). The spherical plain bearing 1334 is fastened to the first moving element 1302, while the spherical plain bearing 1336 is fastened to the second element body 1326. The location of the spherical plain bearing 1334 is selected such that it rotates with respect to the remainder of the tie rod 1332 about a first end bearing pivot point 1338 (shown in FIG. 45) that resides either on or in close proximity to the longitudinal axis 1316, thereby allowing tilting movement of the first moving element 1302 about the longitudinal axis 1316. Similarly, the location of the spherical plain bearing 1336 is selected such that it rotates relative to the remainder of the tie rod 1332 about a second end bearing pivot point 1340 (also shown in FIG. 45) that resides either on or in close proximity to the steering axis 1318, thereby allowing the second moving element 1308 to pivot about the steering axis 1318 relative to the tie rod 1332.

Figure 47:
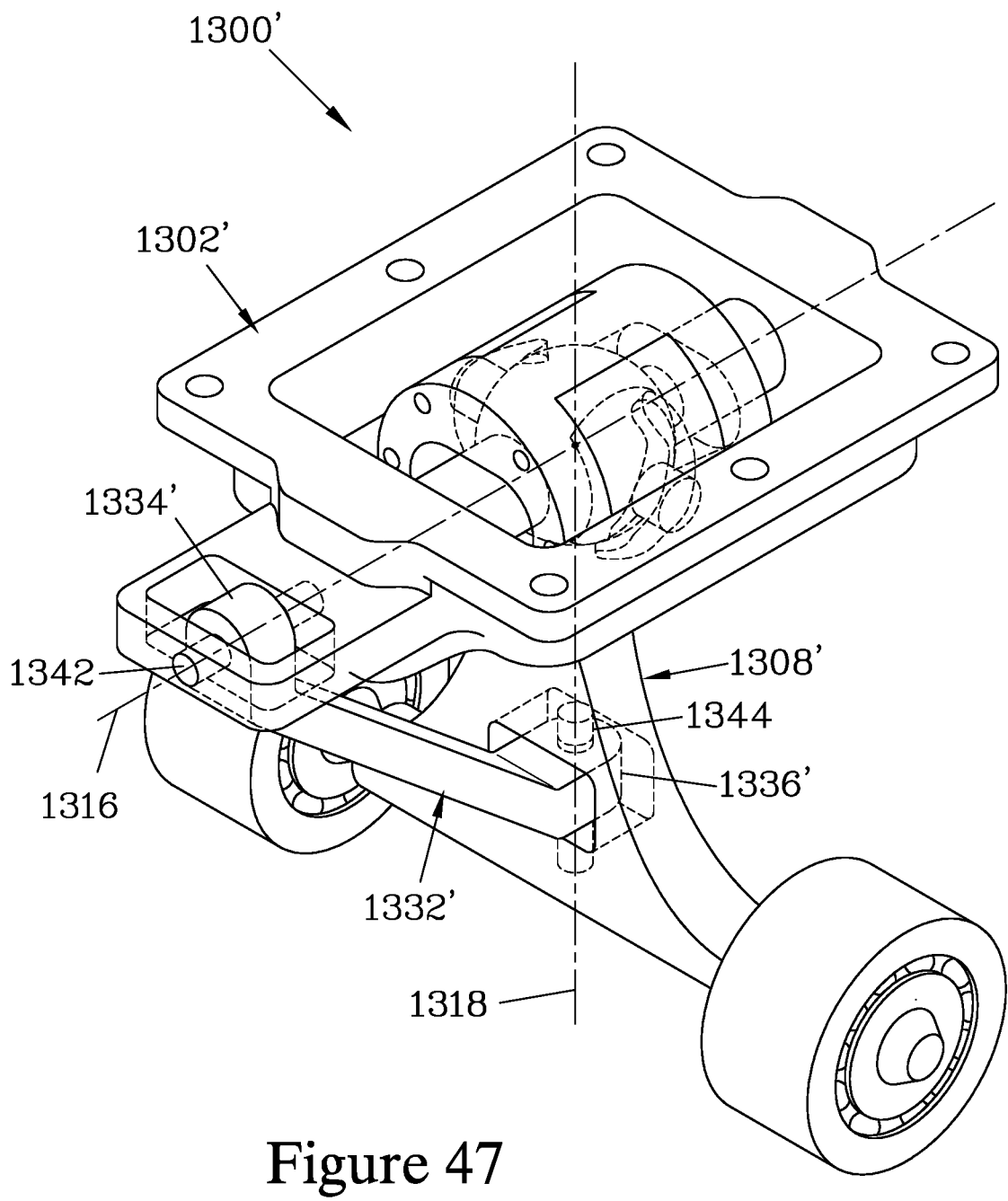
FIG. 47 illustrates a lean-to-steer mechanism of the present invention that is similar to the embodiment shown in FIGS. 45 & 46, but which employs a dedicated brace having a simpler structure.

FIG. 47 illustrates a lean-to-steer mechanism 1300' that is similar to the mechanism 1300 discussed above, but which employs a dedicated diagonal brace 1332' rather than employing a conventional tie rod, to simplify fabrication. The diagonal brace 1332' has a first end pivot structure 1334' that pivotably engages a first element pivot structure 1342 on the first moving element 1302', this engagement allows pivoting between the brace 1332' and the first moving element 1302' about the longitudinal axis 1316. Similarly, the brace 1332' has a second end pivot structure 1336' that pivotably engages a second element pivot structure 1344 provided on the second moving element 1308' to allow pivoting about the steering axis 1318. The brace 1332' also differs in being positioned so as to extend forward of the second moving element 1308'.

While the novel features of the present invention have been described in terms of particular embodiments and preferred applications, it should be appreciated by one skilled in the art that substitution of materials and modification of details can be made without departing from the spirit of the invention. To the extent that the appended claims have been drafted without multiple dependencies, this has been done only to accommodate formal requirements in jurisdictions which do not allow such multiple dependencies. It should be noted that all possible combinations of features which would be implied by rendering the claims multiply dependent are explicitly envisaged and should be considered part of the invention.

What is claimed is:

1. A lean-to-steer mechanism for mounting at least one wheel to a body that traverses a nominally horizontal surface and for steering the at least one wheel about a nominally vertical steering axis in response to leaning of the body about a nominally horizontal longitudinal axis, the lean-to-steer mechanism having:
   an inner spherical element;
   a shaft attached to said inner spherical element and extending therefrom, said shaft being connected to a first moving element that is affixed with respect to the body;
   an outer spherical socket in which said inner spherical element is movably mounted so as to allow motion between said inner spherical element and said outer spherical socket about a central point, and where such allowed motion is not limited to motion about a single axis, said outer spherical socket being incorporated into a second moving element to which the at least one wheel is rotatably mounted so as to rotate about a horizontal wheel axis;
   at least one guided element mounted to one of said first moving element and said second moving element; and at least one guiding element affixed to the other of said first moving element and said second moving element,
said guiding element being configured to engage said guided element to direct said guided element along a non-linear path defined by said guiding element, such engagement limiting the free motion between said first moving element and said second moving element to force steering motion of said second moving element about the steering axis in order to accommodate leaning of the body and said first moving element about the longitudinal axis, such leaning acting to move said guided element along said non-linear path.

2. The lean-to-steer mechanism of claim 1 wherein said at least one guided element is mounted to said first moving element; and
wherein said at least one guiding element is affixed with respect to said second moving element.

3. The lean-to-steer mechanism of claim 2 wherein said at least one guiding element is formed as a guide ramp that comprises:
a linear response segment that directs one of said guided elements along a path that is inclined such that said second moving element is forced to turn relative to said first moving element about the steering axis to accommodate leaning of said first moving element about the longitudinal axis; and
end segments that bracket said linear response segment and are inclined thereto.

4. A lean-to-steer mechanism for mounting at least one wheel to a body that traverses a nominally horizontal surface and for steering the at least one wheel about a nominally vertical steering axis in response to leaning of the body about a nominally horizontal longitudinal axis, the lean-to-steer mechanism comprising:
a first moving element affixed with respect to the body;
a second moving element having the at least one wheel rotatably mounted thereto so as to rotate about a horizontal wheel axis,
said second moving element being movably connected to said first moving element so as to be movable with respect thereto about a central point that resides at the intersection of the steering axis and the longitudinal axis, but where such motion between said first and second moving elements is not limited to rotation about a single axis;
at least one guided element mounted with respect to one of said first moving element and said second moving element; and
at least one guiding element affixed with respect to the other of said first moving element and said second moving element,
said guiding element being configured to engage said guided element to direct said guided element along a non-linear path defined by said guiding element, such engagement limiting the free motion between said first moving element and said second moving element to force steering motion of said second moving element about the steering axis in order to accommodate leaning of the body and said first moving element about the longitudinal axis, such leaning acting to move said guided element along said non-linear path.

5. The lean-to-steer mechanism of claim 4 wherein said at least one guided element is mounted to said first moving element; and
wherein said at least one guiding element is mounted to said second moving element.

6. The lean-to-steer mechanism of claim 5 wherein said at least one guided element is provided by a plurality of guided elements;
further wherein said at least one guiding element is provided by a plurality of guiding elements; and
the lean-to-steer mechanism further comprising:
means for maintaining engagement between said guided elements and said guiding elements.

7. The lean-to-steer mechanism of claim 6 wherein said guided elements are provided by guide bearings mounted to said first moving element so as to each rotate about a guide bearing axis that intersects the central point;
further wherein said guiding elements are shaped ramps protruding from said second moving element; and
yet further wherein said means for maintaining engagement between said guided elements and said guiding elements further comprises:
means for applying a compressive load between said first moving element and said second moving element so as to force said guide bearings against said shaped ramps.

8. The lean-to-steer mechanism of claim 7 wherein said means for maintaining engagement between said guided elements and said guiding elements further comprises:
a shaft retaining element movably mounted to said second moving element so as to pivot with respect thereto at least about the steering axis;
a shaft engaging said shaft retaining element so as to extend perpendicular to the steering axis along said longitudinal axis,
said first moving element being configured to pivotably engage said shaft about the longitudinal axis.

9. The lean-to-steer mechanism of claim 8 wherein said means for applying a compressive load between said first moving element and said second moving element further comprises:
at least one resilient retaining element through which said shaft passes, said resilient retaining element being configured to abut against a bearing surface associated with one of said first moving element and said second moving element; and
at least one shaft clamping element that is advanceable along said shaft toward said bearing surface so as to compress said resilient retaining element against said bearing surface.

10. The lean-to-steer mechanism of claim 9 wherein said shaft retaining element is provided by an inner spherical element that is movably mounted in an outer spherical socket provided in said second moving element so as to be movable with respect to said outer spherical socket about the central point.

11. The lean-to-steer mechanism of claim 4 wherein one of said first moving element and said second moving element is attached to an inner spherical element via a shaft, and the other of said first moving element and said second moving element is provided with an outer spherical socket that movably engages said inner spherical element so as to allow motion therebetween about the central point.

* * * * *

UNITED STATES PATENT AND TRADEMARK OFFICE
CERTIFICATE OF CORRECTION

| | |
|---|---|
| PATENT NO. | : 11,020,651 B2 |
| APPLICATION NO. | : 15/598659 |
| DATED | : June 1, 2021 |
| INVENTOR(S) | : Smith |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 367 days.

Signed and Sealed this
Thirty-first Day of January, 2023

*Katherine Kelly Vidal*

Katherine Kelly Vidal
*Director of the United States Patent and Trademark Office*